US012761750B2

(12) United States Patent
Shin et al.

(10) Patent No.: US 12,761,750 B2
(45) Date of Patent: Oct. 13, 2026

(54) DISPLAY DEVICE AND ELECTRONIC DEVICE

(71) Applicant: Samsung Display Co., Ltd., Yongin-si (KR)

(72) Inventors: Dong Hee Shin, Yongin-si (KR); Sunkwun Son, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/083,145

(22) Filed: Mar. 18, 2025

(65) Prior Publication Data

US 2025/0370561 A1 Dec. 4, 2025

(30) Foreign Application Priority Data

May 29, 2024 (KR) ........................ 10-2024-0070284

(51) Int. Cl.

| | |
|---|---|
| ***G06F 3/041*** | (2006.01) |
| ***G09G 3/32*** | (2016.01) |
| ***G09G 3/3233*** | (2016.01) |
| *G09G 3/3225* | (2016.01) |
| *G09G 3/3258* | (2016.01) |

(52) U.S. Cl.

CPC ........... *G06F 3/04164* (2019.05); *G09G 3/32* (2013.01); *G09G 3/3233* (2013.01); *G09G 3/3225* (2013.01); *G09G 3/3258* (2013.01); *G09G 2300/0426* (2013.01); *G09G 2300/0819* (2013.01); *G09G 2320/0233* (2013.01); *G09G 2320/043* (2013.01); *G09G 2320/045* (2013.01); *G09G 2360/14* (2013.01)

(58) Field of Classification Search

CPC ...... G06F 3/04164; G06F 3/32; G06F 3/3225; G06F 3/3233; G06F 3/3258; G09G 2300/0426; G09G 2300/0819; G09G 2320/0233; G09G 2320/043; G09G 2320/045; G09G 2360/14

USPC ........................................................ 345/173

See application file for complete search history.

(56) References Cited

U.S. PATENT DOCUMENTS 11,276,743 B2 3/2022 Cho et al.
2007/0200832 A1* 8/2007 Cho .................... G06F 3/04184 345/173
2010/0194699 A1* 8/2010 Chang ................... G06F 3/0412 345/173

(Continued)

*Primary Examiner* — Temesghen Ghebretinsae

(74) *Attorney, Agent, or Firm* — Womble Bond Dickinson (US) LLP

(57) ABSTRACT

A display device includes: a base layer, in which a display area and a non-display area are defined; a circuit layer on the base layer; and an element layer on the circuit layer, and including light emitting elements and light receiving elements to correspond to the display area, wherein the circuit layer includes: pixel driving circuits connected to the light emitting elements; sensor driving circuits connected to the light receiving elements; data lines connected to the pixel driving circuits; read-out lines in a first area of the display area, and connected to, among the sensor driving circuits, a first sensor driving circuit in the first area; and a connection line part connecting the read-out lines to a read-out circuit, and wherein the connection line part includes: first connection lines in a second area of the display area; and second connection lines connecting the first connection lines to the read-out lines.

20 Claims, 21 Drawing Sheets

(56) References Cited

U.S. PATENT DOCUMENTS

| | | | | |
|---|---|---|---|---|
| 2011/0310035 | A1* | 12/2011 | Kim | G06F 3/0445 345/173 |
| 2012/0038566 | A1* | 2/2012 | Lin | G06F 3/042 345/173 |
| 2024/0099096 | A1* | 3/2024 | Kim | G06F 3/0446 |
| 2024/0324342 | A1* | 9/2024 | Son | H10K 59/131 |
| 2024/0353951 | A1* | 10/2024 | Song | G06F 3/04164 |
| 2024/0365614 | A1* | 10/2024 | Lee | H10K 59/131 |
| 2025/0014525 | A1* | 1/2025 | Song | G09G 3/3275 |
| 2025/0048874 | A1* | 2/2025 | Lee | H10K 59/13 |
| 2026/0040782 | A1* | 2/2026 | Shin | H10K 59/131 |

* cited by examiner

DISPLAY DEVICE AND ELECTRONIC DEVICE

CROSS-REFERENCE TO RELATED APPLICATION

The present application claims priority to and the benefit of Korean Patent Application No. 10-2024-0070284, filed on May 29, 2024, in the Korean Intellectual Property Office, the entire disclosure of which is incorporated herein by reference.

BACKGROUND

Aspects of some embodiments of the present disclosure described herein relate to a display device having a relatively improved degree of freedom in a sensing area.

A display device provides various functions, such as providing information to the user by displaying an image or sensing a user input, of organically communicate with the user. Recent display devices include functions for sensing biometric information of the users.

Biometric information recognition methods include a capacitance method of detecting changes in capacitance formed between electrodes, an optical method of detecting incident light by using an optical sensor, and an ultrasonic method of detecting vibration by using a piezoelectric material.

The above information disclosed in this Background section is only for enhancement of understanding of the background and therefore the information discussed in this Background section does not necessarily constitute prior art.

SUMMARY

Aspects of some embodiments of the present disclosure include a display device having a relatively improved degree of freedom in a sensing area, and a biometric information recognition function.

According to some embodiments, a display device includes a base layer, in which a display area and a non-display area are defined, a circuit layer on the base layer, and an element layer on the circuit layer, and including light emitting elements and light receiving elements corresponding to the display area, the circuit layer includes pixel driving circuits connected to the light emitting elements, sensor driving circuits connected to the light receiving elements, data lines connected to the pixel driving circuits, read-out lines in a first area of the display area, and connected to, among the sensor driving circuits, a first sensor driving circuit in the first area, and a connection line part connecting the read-out lines to a read-out circuit, and the connection line part includes first connection lines in a second area of the display area, and second connection lines connecting the first connection lines to the read-out lines.

According to some embodiments, the read-out lines and the first connection lines may extend in a first direction, and may be arranged in a second direction crossing the first direction, and the second connection lines may extend in the second direction.

According to some embodiments, the read-out lines and the first connection lines may be on the same layer.

According to some embodiments, the data lines may be on the same layer as that of the read-out lines and the first connection lines.

According to some embodiments, the second connection lines may be on a different layer from that of the read-out lines and the first connection lines.

According to some embodiments, the circuit layer may further include a bridge line electrically connecting the second connection lines to the read-out lines and the first connection lines.

According to some embodiments, the bridge line may further include a first bridge line electrically connecting the read-out lines and the second connection lines, and a second bridge line electrically connecting the first connection lines and the second connection lines.

According to some embodiments, the bridge line may be on a different layer from that of the read-out lines and the first connection lines.

According to some embodiments, the light receiving elements may include a first light receiving element in the first area, and a second light receiving element in the second area.

According to some embodiments, the first light receiving element may include a first electrode, a photoelectric conversion layer on the first electrode, and a second electrode on the photoelectric conversion layer, the second light receiving element may include a third electrode, and a fourth electrode on the third electrode, and the photoelectric conversion layer may not be between the third electrode and the fourth electrode.

According to some embodiments, the sensor driving circuits may include a first sensor driving circuit in the first area and connected to the first light receiving element, and a second sensor driving circuit in the second area and connected to the second light receiving element.

According to some embodiments, the first sensor driving circuit may include a first output transistor electrically connected to a corresponding one of the read-out lines, and the second sensor driving circuit may include a second output transistor electrically connected to a corresponding one of the first connection lines.

According to some embodiments, the first light receiving element may include a first electrode, a first photoelectric conversion layer on the first electrode, and a second electrode on the photoelectric conversion layer, and the second light receiving element may include a third electrode, a second photoelectric conversion layer on the third electrode, and a fourth electrode on the second photoelectric conversion layer.

According to some embodiments, the sensor driving circuits may include a first sensor driving circuit in the first area and connected to the first light receiving element, and a second sensor driving circuit in the second area and connected to the second light receiving element.

According to some embodiments, the first sensor driving circuit may include a first output transistor electrically connected to a corresponding one of the read-out lines, and the second sensor driving circuit may include a second output transistor electrically separated from a corresponding one of the first connection lines.

According to some embodiments, the display device may further include a color filter layer including a light shielding pattern layer, in which a plurality of openings are defined, and a plurality of color filters overlapping the openings, on the element layer.

According to some embodiments, the color filter layer may further include a dummy color filter corresponding to the light receiving element.

According to some embodiments, the dummy color filter may not be in the second area.

According to some embodiments, the second area may include a (2-1)-th area and a (2-2)-th area being spaced apart from each other with the first area being interposed therebetween.

According to some embodiments, a plurality of first areas may be provided, and the second area may further include (2-3)-th areas between the first areas.

According to some embodiments, a display device includes a base layer, in which a display area and a non-display area are defined, a circuit layer on the base layer, and an element layer on the circuit layer, and including light emitting elements corresponding to the display area, first light receiving elements in a first area of the display area, and second light receiving elements in a second area of the display area, the circuit layer includes pixel driving circuits connected to the light emitting elements, first sensor driving circuits connected to the first light receiving elements, second sensor driving circuits connected to the second light receiving elements, data lines connected to the pixel driving circuits, read-out lines in the first area of the display area, and connected to the first sensor driving circuits, and a connection line part connecting the read-out lines to a read-out circuit, and the connection line part includes first connection lines in a second area of the display area, and second connection lines connecting the first connection lines to the read-out lines.

According to some embodiments, the first light receiving element may include a first electrode, a photoelectric conversion layer on the first electrode, and a second electrode on the photoelectric conversion layer, the second light receiving element includes a third electrode, and a fourth electrode on the third electrode, and the photoelectric conversion layer may not be between the third electrode and the fourth electrode.

According to some embodiments, the first sensor driving circuit may include a first output transistor electrically connected to a corresponding one of the read-out lines, and the second sensor driving circuit may include a second output transistor electrically connected to a corresponding one of the first connection lines.

According to some embodiments, the first light receiving element may include a first electrode, a first photoelectric conversion layer on the first electrode, and a second electrode on the photoelectric conversion layer, and the second light receiving element may include a third electrode, a second photoelectric conversion layer on the third electrode, and a fourth electrode on the second photoelectric conversion layer.

According to some embodiments, the first sensor driving circuit may include a first output transistor electrically connected to a corresponding one of the read-out lines, and the second sensor driving circuit may include a second output transistor electrically separated from a corresponding one of the first connection lines.

According to some embodiments, the display device may further include a color filter layer including a light shielding pattern layer, in which a plurality of openings are defined, and a plurality of color filters overlapping the openings, on the element layer.

According to some embodiments, the color filter layer may further include a dummy color filter corresponding to the light receiving element.

According to some embodiments, the dummy color filter may not be in the second area.

According to some embodiments, the display device may further include a sensor chip including the read-out circuit, and a driving chip, to which the data lines are connected.

According to some embodiments, the driving chip and the sensor chip may be adjacent to one side of the display area.

According to some embodiments, an electronic device includes a display device including a base layer, in which a display area and a non-display area are defined, a circuit layer on the base layer, and an element layer on the circuit layer, and including light emitting elements and light receiving elements corresponding to the display area, the circuit layer includes pixel driving circuits connected to the light emitting elements, sensor driving circuits connected to the light receiving elements, data lines connected to the pixel driving circuits, read-out lines in a first area of the display area, and connected to, among the sensor driving circuits, a first sensor driving circuit in the first area, and a connection line part connecting the read-out lines to a read-out circuit, and the connection line part includes first connection lines in a second area of the display area, and second connection lines connecting the first connection lines to the read-out lines.

BRIEF DESCRIPTION OF THE DRAWINGS

The above and other aspects and characteristics of embodiments according to the present disclosure will become more apparent by describing in more detail aspects of some embodiments thereof with reference to the accompanying drawings.

DETAILED DESCRIPTION

Figure 1:
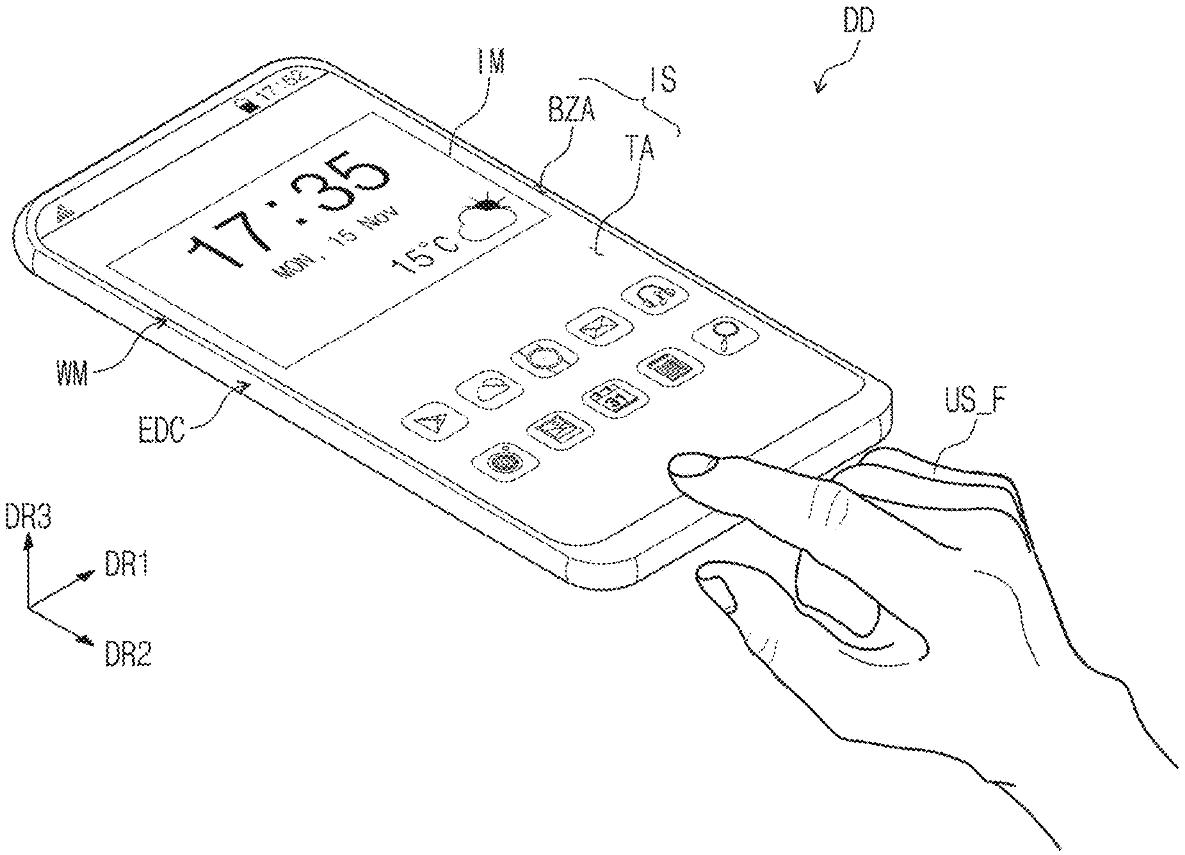
FIG. 1 is a perspective view of a display device according to some embodiments of the present disclosure.

The present disclosure may be subject to various changes and have various forms, and thus, specific embodiments will be illustrated in the drawings and described in detail in the text. However, this is not intended to limit the present disclosure to a specific disclosed form, and should be understood to include all changes, equivalents, and substitutes included in the spirit and technical scope of the present disclosure.

In the specification, when it is mentioned that a component (or an area, a layer, a part, or the like) is "located on", "connected to", or "coupled to" another component, it means that the former component may be directly located on, connected to, or coupled to the latter component or a third component may be located between the components.

The same reference numerals denote the same components. Furthermore, in the drawings, thicknesses, ratios, dimensions of the components are exaggerated for an effective description of the technical contents.

The term "and/or" includes one or more combinations that may be defined by the associated components.

Furthermore, in describing the various components, the terms, such as first and second may be used, but the present disclosure is not limited by the terms. The terms are simply for distinguishing the components. For example, a first component may be named a second component, and similarly the second component also may be named the first component while not departing from the scope of the present disclosure. A singular expression includes a plural expression unless an exemption is explicitly described in the context.

Furthermore, the terms, such as "under", "below", "on", and "above", are used to describe an associative relationship between the components illustrated in the drawings. The terms are relative concepts, and are described with respect to directions indicated in the drawings.

Unless otherwise defined, all terms, including technical and scientific terms, used herein have the same meaning as commonly understood by those skilled in the art to which the present disclosure pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

When the terms, such as "comprise" and/or "comprising", is used in the specification, it should be understood that they specify presence of the above-mentioned features, numbers, steps, operations, components, parts, and/or combinations thereof, and do not exclude presence or addition of one or more other numbers, steps, operations, components, parts, and/or combinations thereof.

Hereinafter, aspects of some embodiments of the present disclosure will be described in more detail with reference to the drawings.

Figure 2A:
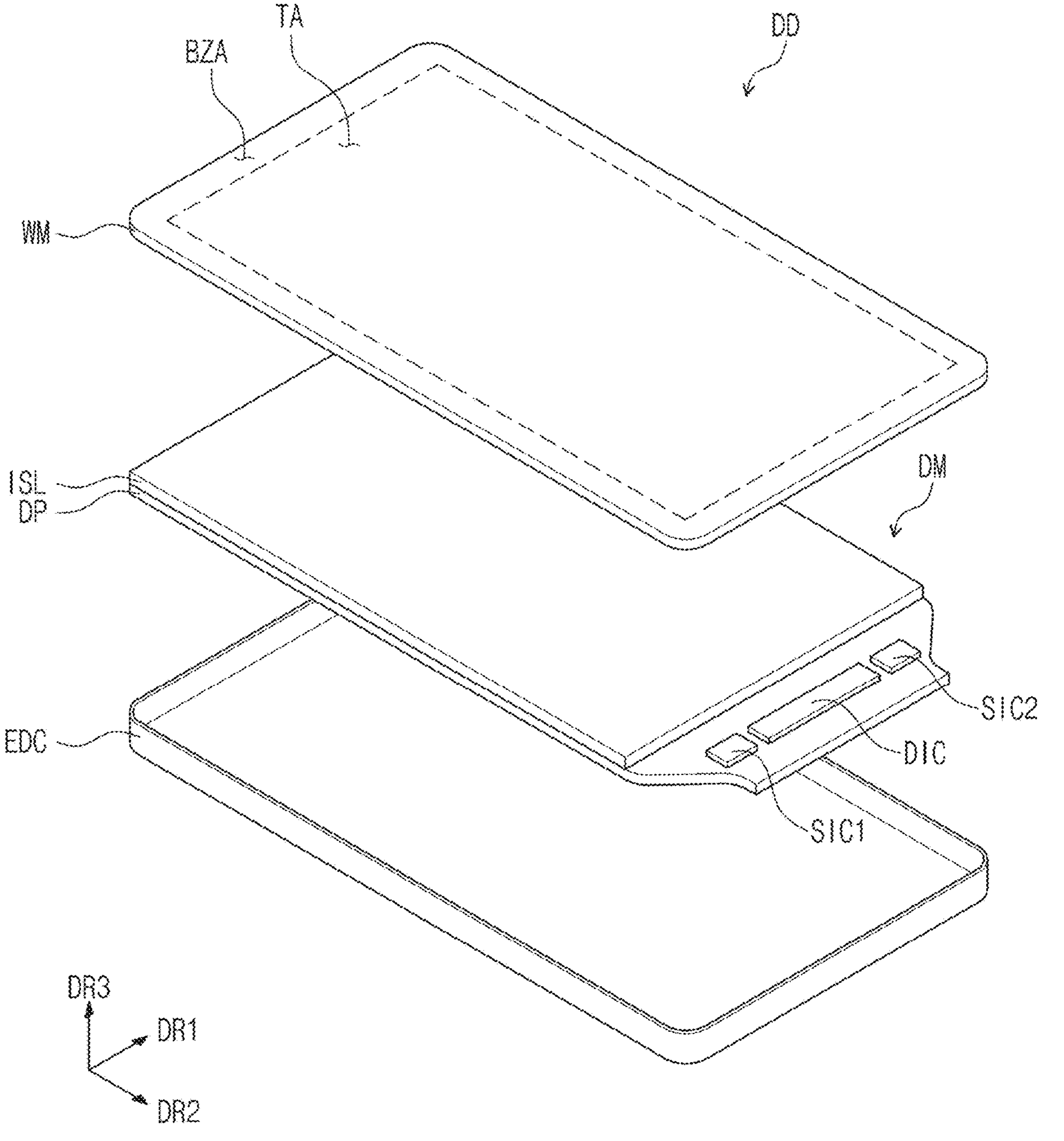
FIG. 2A is an exploded perspective view of a display device according to some embodiments of the present disclosure.
Figure 2B:
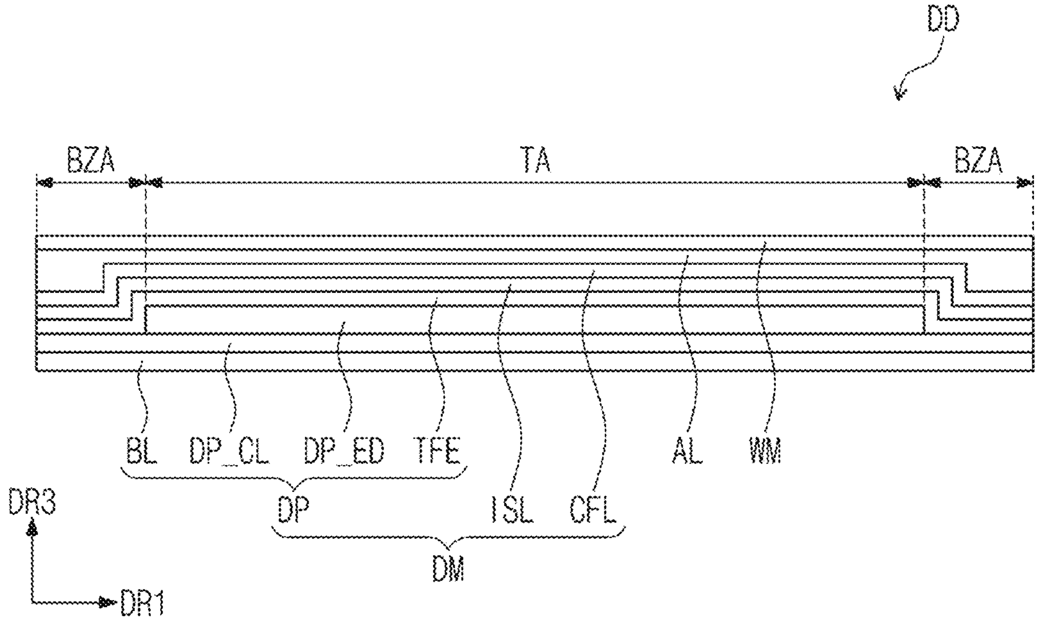
FIG. 2B is a cross-sectional view of a display device according to some embodiments of the present disclosure.

FIG. 1 is a perspective view of a display device according to some embodiments of the present disclosure, FIG. 2A is an exploded perspective view of the display device according to some embodiments of the present disclosure, and FIG. 2B is a cross-sectional view of the display device according to some embodiments of the present disclosure.

Referring to FIGS. 1, 2A, and 2B, a display device DD according to some embodiments of the present disclosure has a generally rectangular shape having short sides that are parallel to a first direction DR1, and long sides that are parallel to a second direction DR2 that crosses the first direction DR1. However, embodiments according to the present disclosure are not limited thereto, and the display device DD may have various shapes, such as a circular shape and a polygonal shape. According to various embodiments, the corners of the display device DD may have rounded corners.

The display device DD may be a device that is activated according to an electrical signal. The display device DD may include various embodiments. For example, the display device DD may be applied to electronic devices, such as smart watches, tablets, laptops, computers, and smart televisions.

Hereinafter, a normal direction that is substantially perpendicular to a plane defined by the first direction DR1 and the second direction DR2 is defined as a third direction DR3. In the specification, the phrases "when viewed on a plane" or "in a plan view" a view from the third direction DR3 or toward a display surface of the display device DD.

An upper surface of the display device DD may be defined as a display surface IS and may be parallel to the plane defined by the first direction DR1 and the second direction DR2. Images IM generated by the display device DD may be provided to the user through the display surface IS.

The display surface IS may be divided into a transmission area TA and a bezel area BZA. The transmission area TA may be an area, in which the images IM are displayed. The user visually recognizes the images IM through the transmission area TA. According to some embodiments, the transmission area TA is illustrated as a rectangular shape with rounded corners. However, this is illustrated by way of example, and the transmission area TA may have various shapes, and is not limited to any one embodiment.

The bezel area BZA is adjacent to the transmission area TA. The bezel area BZA may have a specific color. The bezel area BZA may surround the transmission area TA. Accordingly, a shape of the transmission area TA may be substantially defined by the bezel area BZA. However, this is illustrated by way of example, and the bezel area BZA may be located adjacent to only one side of the transmission area TA or may be omitted.

The display device DD may sense an external input applied from an outside. An external input may include various types of inputs provided from the outside of the display device DD. For example, an external input may include not only a contact by a portion of the body of the user, such as a hand US_F of the user or a contact by a separate device (e.g. an active pen, a digitizer, or the like), but also an external input (e.g. hovering) that is approaches the display device DD or is applied adjacent to it at a specific distance. Furthermore, an external input may have various forms, such as a force, a pressure, a temperature, and light.

The display device DD may sense biometric information of the user, which is applied from the outside. The display surface IS of the display device DD may be provided with a biometric information sensing area that may sense the biometric information of the user. The biometric information sensing area may be provided in the entire transmission area TA, or may be provided in a partial area of the transmission area TA. FIG. 1 illustrates as an example of the present disclosure that the entire transmission area TA is utilized as the biometric information sensing area.

The display device DD may include a window WM, a display module DM, and a housing EDC. According to some embodiments, the window WM and the housing EDC are coupled to constitute an external appearance of the display device DD.

A front surface of the window WM defines the display surface IS of the display device DD. The window WM may include an optically transparent insulating material. For example, the window WM may include glass or plastic. The window WM may have a multilayer structure or a single-layer structure. For example, the window WM may include a plurality of plastic films coupled to each other by an adhesive, or may include a glass substrate and a plastic film coupled to each other by an adhesive.

The display module DM may include a display panel DP and an input sensing layer ISL. The display panel DP may display images according to electrical signals, and the input sensing layer ISL may sense an external input from the outside. The external input may be provided in various forms.

The display panel DP according to some embodiments of the present disclosure may be a light emitting display panel, and is not particularly limited. For example, the display panel DP may be an organic light emitting display panel, an inorganic light emitting display panel, or a quantum dot light emitting display panel. A light emission layer of the organic light emitting display panel may include an organic light emitting material, and a light emission layer of the inorganic light emitting display panel may include an inorganic light emitting material. A light emission layer of the quantum dot light emitting display panel may include quantum dots and quantum rods. Hereinafter, the display panel DP will be described as an organic light emitting display panel.

Referring to FIG. 2B, the display panel DP includes a base layer BL, a circuit layer DP_CL, an element layer DP_ED, and an encapsulation layer TFE. The display panel DP according to the present disclosure may be a flexible display panel. However, embodiments according to the present disclosure are not limited thereto. For example, the display panel DP may be a foldable display panel or a rigid display panel that is folded with respect to a folding axis.

The base layer BL may include a synthetic resin layer. The synthetic resin layer may be a polyimide resin layer, and the material is not particularly limited. In addition, the base layer BL may include a glass substrate, a metal substrate, or an organic/inorganic composite material substrate.

The circuit layer DP_CL is located on the base layer BL. The circuit layer DP_CL is located between the base layer BL and the element layer DP_ED. The circuit layer DP_CL includes at least one insulating layer and a circuit element. Hereinafter, the insulating layer included in the circuit layer DP_CL is referred to as an intermediate insulating layer. The intermediate insulating layer includes at least one intermediate inorganic film and at least one intermediate organic film. The circuit element may include a pixel driving circuit included in each of a plurality of pixels for displaying an image, and a sensor driving circuit included in each of a plurality of sensors for recognizing external information. The external information may be biometric information. As an example in the present disclosure, the sensor may be a fingerprint recognition sensor, a proximity sensor, an iris recognition sensor, a blood pressure measurement sensor, or an illumination sensor. Furthermore, the sensor may be an optical sensor that recognizes biometric information in an optical manner. The circuit layer DP_CL may further include signal lines that are connected to the pixel driving circuit and/or the sensor driving circuit.

The element layer DP_ED may include light emitting elements included in the pixels, and light receiving elements included in the sensors. As an example in the present disclosure, the light receiving element may be a photo diode. The light receiving element may be a sensor that senses or reacts to light that is reflected by a fingerprint of the user. The circuit layer DP_CL and the element layer DP_ED will be described in detail later with reference to FIGS. 6 to 14C.

The encapsulation layer TFE seals the element layer DP_ED. The encapsulation layer TFE may include at least one organic film and at least one inorganic film. The inorganic film may include inorganic materials, and may protect the element layer DP_ED from moisture/oxygen. The inorganic film may include a silicon nitride layer, a silicon oxy nitride layer, a silicon oxide layer, a titanium oxide layer, or an aluminum oxide layer, but embodiments according to the present disclosure are not particularly limited thereto. The organic layer contains organic materials, and may protect the element layer DP_ED from foreign substances, such as dust particles.

An input sensing layer ISL may be formed on the display panel DP. The input sensing layer ISL may be located directly on the encapsulation layer TFE. According to some embodiments of the present disclosure, the input sensing layer ISL may be formed on the display panel DP through a continuous process. That is, when the input sensing layer ISL is located directly on the display panel DP, an adhesion film is not located between the input sensing layer ISL and the encapsulation layer TFE. Alternatively, an adhesion film may be located between the input sensing layer ISL and the display panel DP. In this case, the input sensing layer ISL is not manufactured through a continuous process with the display panel DP, and may be fixed to an upper surface of the display panel DP by an adhesion film after being manufactured through a separate process from the display panel DP.

The input sensing layer ISL may sense an external input (for example, a touch of the user), change it into a specific input signal, and provide the input signal to the display panel DP. The input sensing layer ISL may include a plurality of sensing electrodes for sensing an external input. The sensing electrodes may sense an external input in a capacitive manner. The display panel DP may receive an input signal from the input sensing layer ISL and generate an image corresponding to the input signal.

The display module DM may further include a color filter layer CFL. According to some embodiments of the present disclosure, the color filter layer CFL may be located on the input sensing layer ISL. However, embodiments according to the present disclosure are not limited thereto. The color filter layer CFL may be located between the display panel DP and the input sensing layer ISL. The color filter layer CFL may include a plurality of color filters and a black matrix.

Details of the structures of the input sensing layer ISL and the color filter layer CFL will be described in more detail later.

The display device DD according to some embodiments of the present disclosure may further include an adhesion layer AL. The window WM may be attached to the input sensing layer ISL by the adhesion layer AL. The adhesion layer AL may include any suitable adhesive material, such as an optically clear adhesive, an optically clear adhesive resin, or a pressure sensitive adhesive (PSA).

The display module DM may further include a driving chip DIC and sensor chips SIC1 and SIC2. According to some embodiments of the present disclosure, the driving chip DIC and the sensor chips SIC1 and SIC2 may be mounted on the display panel DP. The driving chip DIC and the sensor chips SIC1 and SIC2 may be located adjacent to one end (hereinafter, a first end) of the display panel DP. FIG. 2A illustrates a structure, in which the driving chip DIC and the sensor chips SIC1 and SIC2 are located adjacent to the first end of the display panel DP, but embodiments according to the present disclosure are not limited thereto. For example, the driving chip DIC may be located adjacent to the first end of the display panel DP, and the sensor chips SIC1 and SIC2 may be located adjacent to a second end that is opposite to the first end of the display panel DP.

According to some embodiments of the present disclosure, the sensor chips SIC1 and SIC2 may include a first sensor chip SIC1 that are located on one side (hereinafter, a first side) of the driving chip DIC, and a second sensor chip SIC2 that is located on a second side that is different from the first side of the driving chip DIC. However, alternatively, the first and second sensor chips SIC1 and SIC2 may be integrated into one sensor chip, and one sensor chip may be located adjacent to the driving chip DIC. In embodiments according to the present disclosure, the numbers of the sensor chips SIC1 and SIC2 and the driving chips DIC are not particularly limited.

The housing EDC is coupled to the window WM. The housing EDC is coupled to the window WM to provide a specific interior space. The display module DM may be accommodated in the interior space. The housing EDC may include a material with a relatively high rigidity. For example, the housing EDC may include a plurality of frames and/or plates that are formed of glass, plastic, or metal, or a combination thereof. The housing EDC may reliably protect the components of the display device DD accommodated in the interior space from an external impact. According to some embodiments, a battery module that supplies electric power required for an overall operation of the display device DD may be located between the display module DM and the housing EDC.

Figure 3:
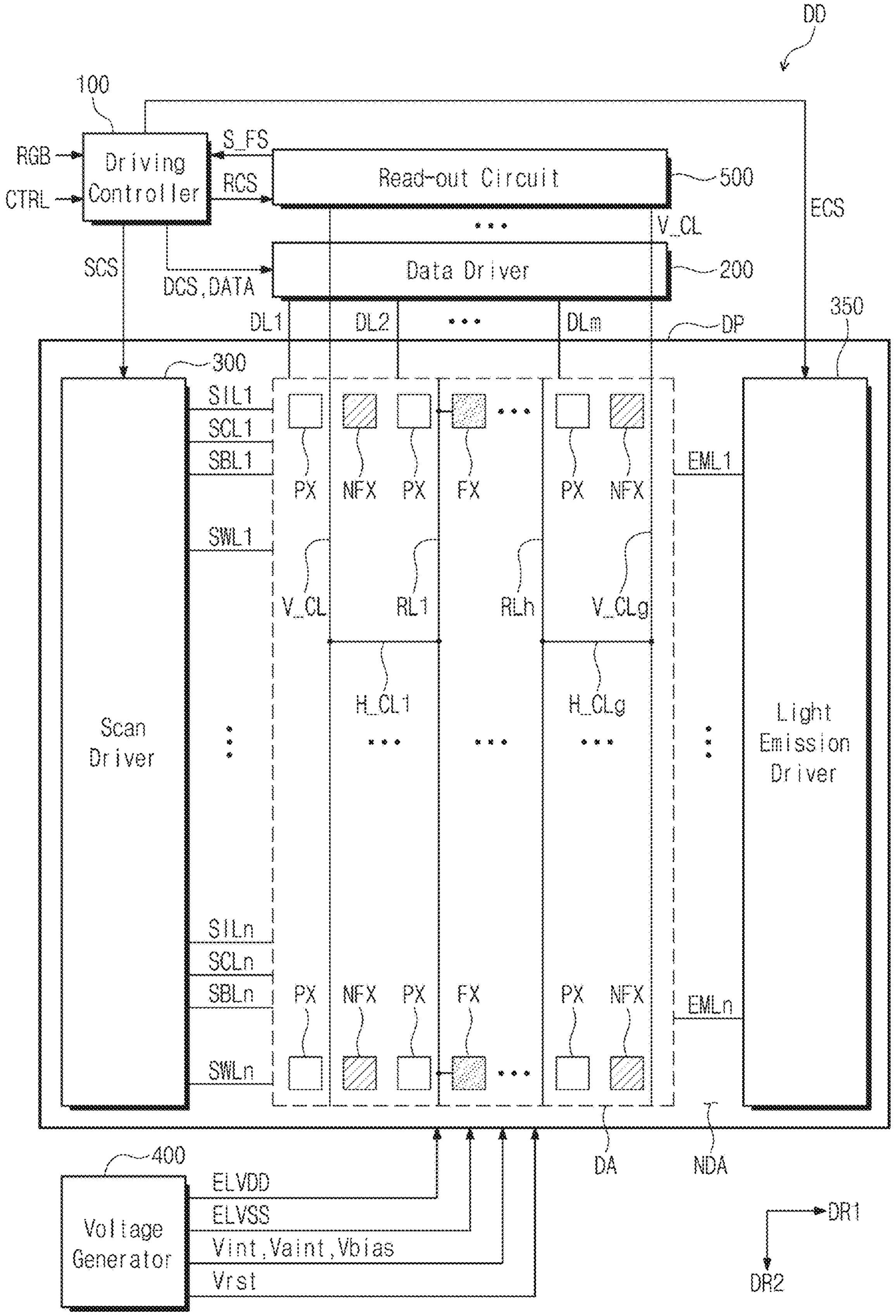
FIG. 3 is a block diagram of a display device according to some embodiments of the present disclosure.

FIG. 3 is a block diagram of a display device according to some embodiments of the present disclosure.

Referring to FIG. 3, the display device DD includes a display panel DP, a panel driver, and a driving controller 100. According to some embodiments of the present disclosure, the panel driver includes a data driver 200, a scan driver 300, a light emission driver 350, a voltage generator 400, and a read-out circuit 500.

The driving controller 100 receives an image signal RGB and a control signal CTRL. The driving controller 100 generates image data DATA by converting the data format of the image signal RGB to meet the interface specifications with the data driver 200. The driving controller 100 outputs a first control signal SCS, a second control signal ECS, a third control signal DCS, and a fourth control signal RCS.

The data driver 200 receives the third control signal DCS and the image data DATA from the driving controller 100. The data driver 200 converts the image data DATA into data signals, and outputs the data signals to a plurality of data lines DL1 to DLm, which will be described later. Data signals are analog voltages corresponding to grayscale values of the image data DATA. According to some embodiments of the present disclosure, the data driver 200 may be embedded in the driving chip DIC illustrated in FIG. 2A.

The scan driver 300 receives the first control signal SCS from the driving controller 100. The scan driver 300 may output scan signals through scan lines in response to the first control signal SCS.

The voltage generator 400 generates voltages that are necessary for an operation of the display panel DP. According to some embodiments, the voltage generator 400 includes a first driving voltage ELVDD, a second driving voltage ELVSS, a first initializing voltage Vint, a second initializing voltage Vaint, a bias voltage Vbias, and a reset voltage VRst.

The display panel DP may include a display area DA corresponding to (e.g., overlapping in a plan view) the transmission area TA (illustrated in FIG. 1), and a non-display area NDA corresponding to (e.g., overlapping in a plan view) the bezel area BZA (illustrated in FIG. 1).

The display panel DP may include a plurality of pixels PX that are located in the display area DA, and a plurality of sensors FX and NFX that are located in the display area DA. According to some embodiments of the present disclosure, each of the plurality of sensors FX and NFX may be located between two adjacent pixels PX. The plurality of pixels PX and the plurality of sensors FX and NFX may be alternately arranged in the first and second directions DR1 and DR2. However, embodiments according to the present disclosure are not limited thereto. That is, two or more pixels PX may be located between, among the plurality of sensors FX and NFX, two sensors FX and NFX that are adjacent to each other in the first direction DR1, two or more pixels PX may be located between, among the plurality of sensors FX and NFX, two sensors FX and NFX that adjacent to each other in the second direction DR2.

The display panel DP may further include initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLM, and read-out lines RL1 to RLh. The initialization scan lines SIL1 to SILn, the compensation scan lines SCL1 to SCLn, the write scan lines SWL1 to SWLn, the black scan lines SBL1 to SBLn and the light emission control lines EML1 to EMLn extend in the first direction DR1. The initialization scan lines SIL1 to SILn, the compensation scan lines SCL1 to SCLn, the write scan lines SWL1 to SWLn, the black scan lines SBL1 to SBLn, and the light emission control lines EML1 to EMLn may be arranged to be spaced apart from each other in the second direction DR2. The data lines DL1 to DLm and the read-out lines RL1 to RLh extend in the second direction DR2, and are arranged to be spaced apart from each other in the first direction DR1. Here, "n", "m", and "h" are natural numbers greater than or equal to 1.

The display panel DP may further include vertical connection lines V_CL1 to V_CLg that are directly connected to the read-out circuit 500, and horizontal connection lines H_CL1 to H_CLg that are connected to the read-out lines RL1 to RLh. The vertical connection lines V_CL1 to V_CLg may extend in the second direction DR2, and the horizontal connection lines H_CL1 to H_CLg may extend in the first direction DR1. Here, "g" is a natural number that is equal to or greater than 1.

According to some embodiments of the present disclosure, some or all of the read-out lines RL1 to RLh may be are connected to a read-out circuit 500 through the vertical connection lines V_CL1 to V_CLg and the horizontal connection lines H_CL1 to H_CLg. When some of the read-out lines RL1 to RLh are connected to the read-out circuit 500 through the vertical connection lines V_CL1 to V_CLg and the horizontal connection lines H_CL1 to H_CLg, the remaining ones of the read-out lines RL1 to RLh may be directly connected to the read-out circuit 500. Meanwhile, when all of the read-out lines RL1 to RLh are connected to the read-out circuit 500 through the vertical connection lines V_CL1 to V_CLg and the horizontal connection lines H_CL1 to H_CLg, there may be no read-out line RL1 to RLh that is directly connected to the read-out circuit 500.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the light emission control lines EML1 to EMLn, and the data lines DL1 to DLM, respectively. For example, each of the plurality of pixels PX may be electrically connected to four scan lines. However, the number of the scan lines connected to each of the pixels PX is not limited thereto, and may be changed.

The plurality of sensors FX and NFX may include effective sensors FX and non-effective sensors NFX. The effective sensors FX are electrically connected to the write scan lines SWL1 to SWLn and the read-out lines RL1 to RLh, respectively. Each of the effective sensors FX may be electrically connected to one scan line. However, the present disclosure is not limited thereto. The number of the scan lines connected to each of the sensors FX may be variable. The non-effective sensors NFX may be located adjacent to the vertical connection lines V_CL1 to V_CLg. The non-effective sensors NFX have a similar circuit configuration to the effective sensors FX, but do not output a sensing signal corresponding to external information so that they cannot substantially perform a sensing function of sensing external information. Accordingly, an area, in which the effective sensors FX are located, may be defined as a sensing area that may sense external information, and an area, in which the non-effective sensors NFX are located, may be defined as a non-sensing area that cannot sense external information.

According to some embodiments of the present disclosure, the number of the read-out lines RL1 to RLh may be equal to or less than the number of the data lines DL1 to DLM. For example, the number of the read-out lines RL1 to RLh may correspond to ½, ¼, or ⅛ of the number of the data lines DL1 to DLM. The number of the read-out lines RL1 to RLh may be equal to or greater than the number of the vertical connection lines V_CL1 to V_CLg. When the number of the read-out lines RL1 to RLh is greater than the number of the vertical connection lines V_CL1 to V_CLg, the read-out lines RL1 to RLh that are not connected to the vertical connection lines V_CL1 to V_CLg may be directly connected to the read-out circuit 500.

The scan driver 300 may be located in the non-display area NDA of the display panel DP. The scan driver 300 receives the first control signal SCS from the driving controller 100. The scan driver 300 outputs initialization scan signals to the initialization scan lines SIL1 to SILn and compensation scan signals to the compensation scan lines SCL1 to SCLn in response to the first control signal SCS. Furthermore, the scan driver 300 outputs write scan signals to the write scan lines SWL1 to SWLn, and black scan signals to the black scan lines SBL1 to SBLn in response to the first control signal SCS. Alternatively, the scan driver 300 may include first and second scan drivers. The first scan driver may output initialization scan signals and compensation scan signals, and the second scan driver may output write scan signals and black scan signals.

The light emission driver 350 may be located in the non-display area NDA of the display panel DP. The light emission driver 350 receives the second control signal ECS from the driving controller 100. The light emission driver 350 may output light emission control signals to the light emission control lines EML1 to EMLn in response to the second control signal ECS. Alternatively, the scan driver 300 may be connected to the light emission control lines EML1 to EMLn. In this case, the light emission driver 350 is omitted, and the scan driver 300 may output light emission control signals to the light emission control lines EML1 to EMLn.

The read-out circuit 500 receives the fourth control signal RCS from the driving controller 100. The read-out circuit 500 may receive sensing signals from the read-out lines RL1 to RLh, the vertical connection lines V_CL1 to V_CLg, and the horizontal connection lines H_CL1 to H_CLg in response to the fourth control signal RCS. The read-out circuit 500 may process the received sensing signals, and provide the processed sensing signals S_FS to the driving controller 100. The driving controller 100 may recognize biometric information based on the sensing signals S_FS. According to some embodiments of the present disclosure, the read-out circuit 500 may be embedded in the sensor chips SIC1 and SIC2 illustrated in FIG. 2A.

Figure 4A:
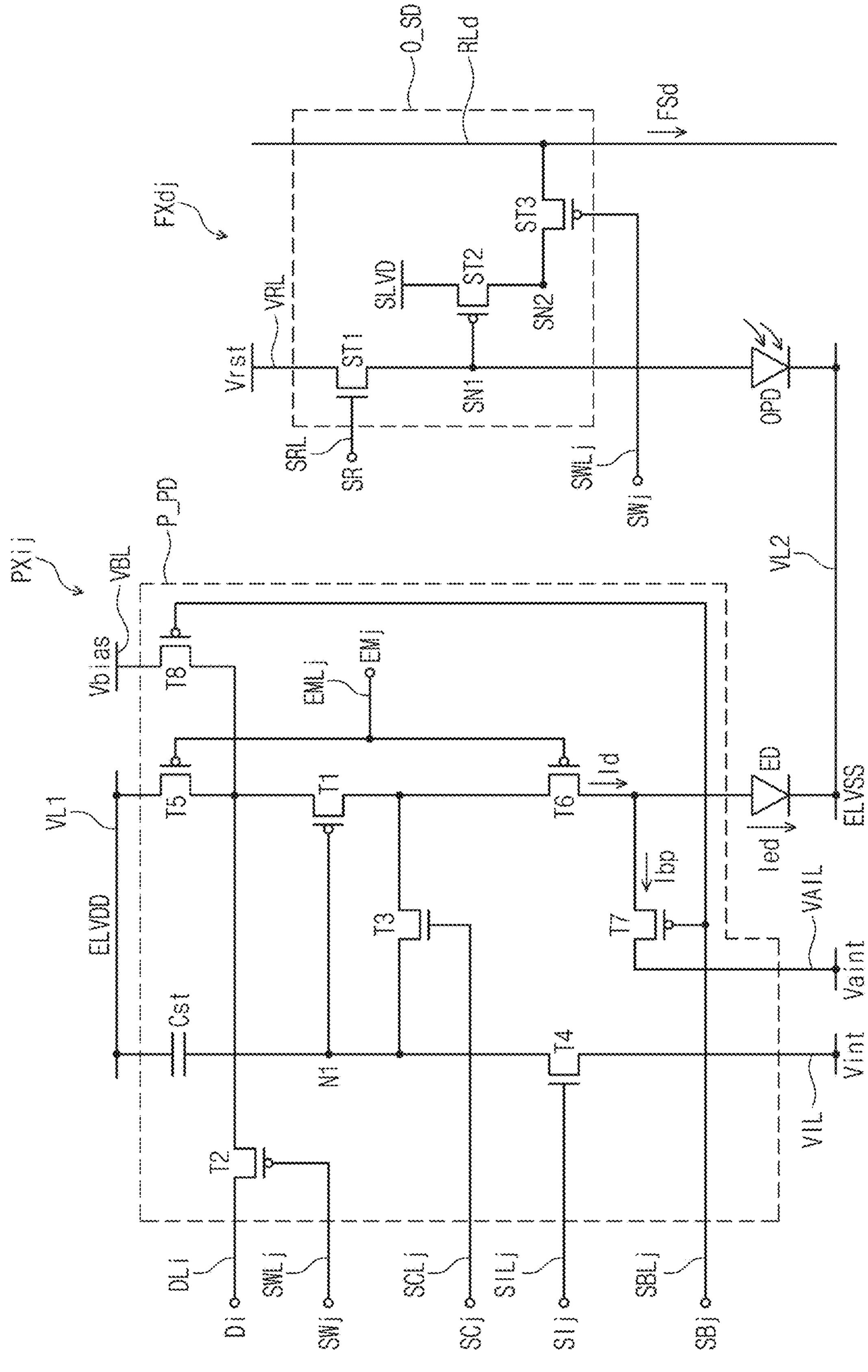
FIG. 4A is a circuit diagram illustrating pixels and a sensor according to some embodiments of the present disclosure.
Figure 4B:
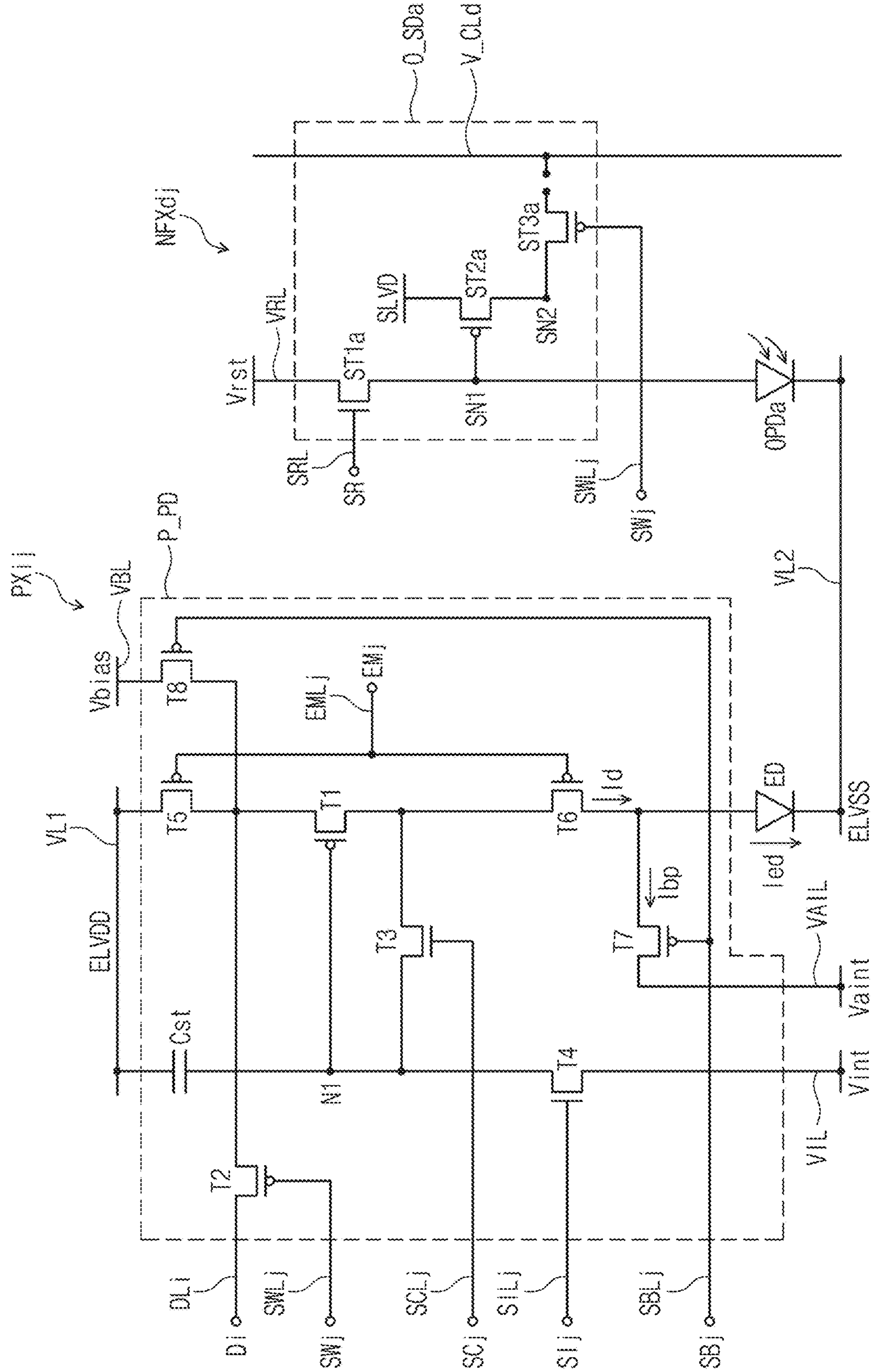
FIG. 4B is a circuit diagram illustrating pixels and a sensor according to some embodiments of the present disclosure.

FIG. 4A is a circuit diagram illustrating pixels and a sensor according to some embodiments of the present disclosure, and FIG. 4B is a circuit diagram illustrating pixels and a sensor according to some embodiments of the present disclosure. Although FIGS. 4A and 4B illustrate various components in a pixel and sensor according to some embodiments, embodiments according to the present disclosure are not limited thereto, and according to various embodiments, the pixel and sensor may include additional components or fewer components without departing from the spirit and scope of embodiments according to the present disclosure.

Figure 4C:
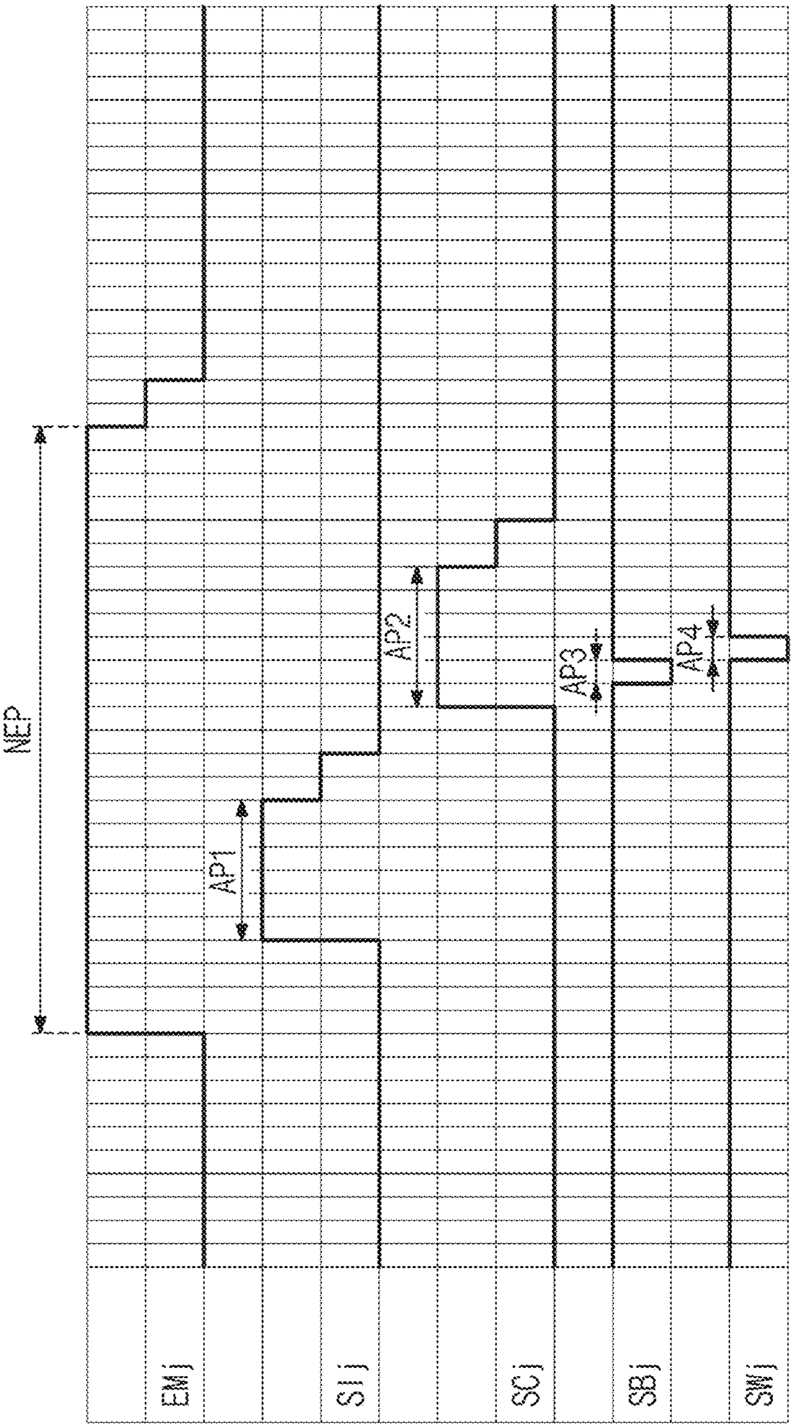
FIG. 4C is a waveform diagram illustrating operations of pixels and a sensor illustrated in FIG. 4A.

FIG. 4A illustrates, by way of example, an equivalent circuit diagram of one pixel PXij, among the plurality of pixels PX illustrated in FIG. 3. Because the plurality of pixels PX have the same circuit structure, a detailed description of the remaining pixels will be omitted in the description of the circuit structure of the pixel PXij. Furthermore, FIG. 4A illustrates, by way of example, an equivalent circuit diagram of one effective sensor FXdj, among the plurality of effective sensors FX illustrated in FIG. 3. Because the plurality of effective sensors FX have the same circuit structure, a detailed description of the remaining pixels will be omitted for the description of the circuit structure of the sensor FXdj. Furthermore, FIG. 4C illustrates, by way of example, an equivalent circuit diagram of one non-effective sensor NFXdj, among the plurality of non-effective sensors NFX illustrated in FIG. 3. Because the plurality of non-effective sensors NFXdj have the same circuit structure, a detailed description of the remaining pixels will be omitted in the description of the circuit structure of the non-effective sensor NFXdj.

Referring to FIG. 4A, the pixel PXij is electrically connected to an i-th data line DLi, among the data lines DL1 to DLm, a j-th initialization scan line SILj, among the initialization scan lines SIL1 to SILn, a j-th compensation scan line SCLj, among the compensation scan lines SCL1 to SCLn, a j-th write scan line SWLj, among the write scan lines SWL1~SWLn, j-th black scan line SWLj, among black scan lines SBL1 to SBLn, and a j-th light emission control line EMLj, among the light emission control lines EML1 to EMLn.

The pixel PXij includes a light emitting element ED and a pixel driving circuit P_PD. The light emitting element ED may be a light emitting diode. According to some embodiments of the present disclosure, a light emitting element ED may be an organic light emitting diode including an organic light emission layer.

The pixel driving circuit P_PD includes first to eighth transistors T1, T2, T3, T4, T5, T6, T7, and T8 and one capacitor Cst. At least one of the first to eighth transistors T1 to T8 may be a transistor having a low-temperature polycrystalline silicon (LTPS) semiconductor layer. Some of the first to eighth transistors T1 to T8 may be P-type transistors, and others may be N-type transistors. At least one of the first to eighth transistors T1 to T8 may be a transistor having an oxide semiconductor layer. For example, the third and fourth transistors T3 and T4 may be oxide semiconductor transistors, and the first, second, and fifth to eighth transistors T1, T2, and T5 to T8 may be LTPS transistors. The third and fourth transistors T3 and T4 may be NMOS transistors.

The configuration of the pixel driving circuit P_PD according to the present disclosure is not limited to the embodiments illustrated in FIG. 4A. The pixel driving circuit P_PD illustrated in FIG. 4A is only an example, and the configuration of the pixel driving circuit P_PD may be modified and implemented. For example, the first, second, fifth to eighth transistors T1, T2, and T5 to T8 may all be P-type transistors or N-type transistors.

A j-th initialization scan line SILj, a j-th compensation scan line SCLj, a j-th write scan line SWLj, a j-th black scan line SBLj, and a j-th light emission control line EMLj may transmit a j-th initialization scan signal SIj, a j-th compensation scan signal SCj, a j-th write scan signal SWj, a j-th black scan signal SBj, and a j-th light emission control signal EMj to the pixel PXij, respectively. The i-th data line DLi transmits the i-th data signal Di to the pixel PXij. The i-th data signal Di may have a voltage level corresponding to the image signal RGB (see FIG. 3) that is input to the display device DD (see FIG. 3).

According to some embodiments of the present disclosure, the pixel PXij may be connected to the first and second driving voltage lines VL1 and VL2, the first and second initialization voltage lines VIL and VAIL, and a bias voltage line VBL. The first driving voltage line VL1 may transmit the first driving voltage ELVDD to the pixel PXij, and the second driving voltage line VL2 may transmit the second driving voltage ELVSS to the pixel PXij. Furthermore, a first initialization voltage line VIL may transmits a first initialization voltage Vint to the pixel PXij, and a second initialization voltage line VAIL may transmit a second initialization voltage Vaint to the pixel PXij. The bias voltage line VBL may transmit the bias voltage Vbias to the pixel PXij.

The first transistor T1 is connected between the first driving voltage line VL1 that receives the first driving voltage ELVDD, and the light emitting element ED. The first transistor T1 may include a first electrode that is connected to the first driving voltage line VL1 via the fifth transistor T5, a second electrode that is connected to an anode electrode of the light emitting element ED via the fifth transistor T5, and a third electrode (for example, a gate electrode) that is connected to one end (for example, a first node N1) of a capacitor Cst. The first transistor T1 may receive the i-th data signal Di transmitted by the i-th data line DLi according to a switching operation of the second transistor T2, and may supply a driving current ID to the light emitting element ED.

The second transistor T2 is connected between the data line DLi and the first electrode of the first transistor T1. The second transistor T2 includes a first electrode that is connected to the data line DLi, a second electrode that is connected to the first electrode of the first transistor T1, and a third electrode (for example, a gate electrode) that is connected to the j-th write scan line SWLj. The second transistor T2 may be turned on according to the write scan signal SWj received through the j-th write scan line SWLj, and may transmit the i-th data signal Di transmitted from the i-th data line DLi, to the first electrode of the first transistor T1.

The third transistor T3 is electrically connected between the second electrode of the first transistor T1 and the first node N1. The third transistor T3 includes a first electrode that is connected to the third electrode of the first transistor T1, a second electrode that is connected to the second electrode of the first transistor T1, and a third electrode (for example, a gate electrode) that is connected to a j-th compensation scan line SCLj. The third transistor T3 may be turned on according to the j-th compensation scan signal SCj received through the j-th compensation scan line SCLj, and may connect the third electrode and the second electrode of the first transistor T1 to connect the first transistor T1 in the form of a diode.

The fourth transistor T4 is electrically connected between the first initialization voltage line VIL, to which the first initialization voltage Vint is applied, and the first node N1. The fourth transistor T4 includes a first electrode that is connected to the first initialization voltage line VIL, through which the first initialization voltage Vint is transmitted, a second electrode that is connected to the first node N1, and a third electrode (for example, a gate electrode) that is connected to a j-th initialization scan line SILj. The fourth transistor T4 is turned on according to the j-th initialization scan signal SIj received through the j-th initialization scan line SILj. The turned-on fourth transistor T4 transmits the first initialization voltage Vint to the first node N1 to initialize a potential (i.e., a potential of the first node N1) of the third electrode of the first transistor T1.

The fifth transistor T5 has a first electrode that is connected to the first driving voltage line VL1, a second electrode that is connected to the first electrode of the first transistor T1, and a third electrode (for example, a gate electrode) that is connected to the j-th light emission control line EMLj.

The sixth transistor T6 includes a first electrode that is connected to the second electrode of the first transistor T1, a second electrode that is connected to the anode electrode of the light emitting element ED, and a third electrode (for example, a gate electrode) that is connected to the j-th light emission control line EMLj.

The fifth and sixth transistors T5 and T6 are simultaneously turned on according to the j-th light emission control signal EMj received through the j-th light emission control line EMLj. The first driving voltage ELVDD applied through the turned-on fifth transistor T5 may be compensated through the first transistor T1 connected in the form of a diode, and then may be transmitted to the light emitting element ED.

The seventh transistor T7 includes a first electrode that is connected to the second initialization voltage line VAIL, through which the second initialization voltage Vaint is transmitted, a second electrode that is connected to the second electrode of the sixth transistor T6, and a third electrode (for example, a gate electrode) that is connected to the j-th black scan line SBLj. The second initialization voltage Vaint may have a voltage level that is lower than or equal to the first initialization voltage Vint.

The eighth transistor T8 includes a first electrode that is connected to the bias voltage line VBL, to which the bias voltage Vbias is transmitted, a second electrode that is connected to the first electrode of the first transistor T1, and a third electrode (for example, a gate electrode) that is connected to the j-th black scan line SBLj.

The seventh and eighth transistors T7 and T8 are simultaneously turned on according to the j-th black scan signal SBj received through the j-th black scan line SBLj. The second initialization voltage Vaint applied through the turned-on seventh transistor T7 may be transmitted to the anode electrode of the light emitting element ED. Accordingly, the anode electrode of the light emitting element ED may be initialized to the second initialization voltage Vaint. The bias voltage Vbias applied through the turned-on eighth transistor T8 may be transmitted to the first electrode of the first transistor T1. Accordingly, the bias voltage Vbias may be periodically applied to the first electrode of the first transistor T1, and as a result, a problem of deterioration of display quality caused as the potential difference between the first and second electrodes of the first transistor T1 increases a specific level or more due to a magnetic hysteresis phenomenon may be prevented or reduced.

As described above, one end of the capacitor Cst is connected to the third electrode of the first transistor T1, and an opposite end thereof is connected to the first driving voltage line VL1. A cathode electrode of the light emitting element ED may be connected to the second driving voltage line VL2 that transmits the second driving voltage ELVSS. The second driving voltage ELVSS may have a voltage level that is lower than the first driving voltage ELVDD. According to some embodiments of the present disclosure, the second driving voltage ELVSS may have a voltage level that is lower than the first and second initialization voltages Vint and Vaint.

Referring to FIGS. 4A and 4C, the j-th light emission control signal EMj has a high level during a non-emission period NEP. In the non-emission period NEP, the j-th initialization scan signal SIj is activated. During an activation period AP1 (hereinafter, a first activation period) of the j-th initialization scan signal SIj, the fourth transistor T4 is turned on in response to the j-th initialization scan signal SIj of a high level when the j-th initialization scan signal SIj of a high level is provided through the j-th initialization scan line SILj. The first initialization voltage Vint is transmitted to the third electrode of the first transistor T1 through the turned-on fourth transistor T4, and the first node N1 is initialized with the first initialization voltage Vint. Accordingly, the first activation period AP1 may be defined as an initialization period of the pixel PXij.

Next, when the j-th compensation scan signal SCj) is activated, and the j-th compensation scan signal SCj of a high level is supplied through the j-th compensation scan line SCLj during the activation period AP2 (hereinafter, the second activation period) of the j-th compensation scan signal SCj, the third transistor T3 is turned on. The first transistor T1 is diode-connected by the turned-on third transistor T3 and is biased forward. The first activation period AP1 may not overlap a second activation period AP2.

The j-th write scan signal SWj is activated in the second activation period AP2. The j-th write scan signal SWj has a low level during the activation period AP4 (hereinafter, the fourth activation period). During a fourth activation period AP4, the second transistor T2 is turned on by the j-th write scan signal SWj of a low level. Then, the compensation voltage ("Di-Vth") reduced by the threshold voltage Vth of the first transistor T1 from the i-th data signal Di supplied from the i-th data line DLi is applied to the third electrode of the first transistor T1. That is, a potential of the third electrode of the first transistor T1 may be the compensation voltage ("Di-Vth"). The fourth activation period AP4 may overlap the second activation period AP2. A duration of the second activation period AP2 may be greater than a duration of the fourth activation period AP4.

A first driving voltage ELVDD and a compensation voltage ("Di-Vth") may be applied to opposite ends of the capacitor Cst, and a charge corresponding to the voltage difference between the opposite ends may be stored in the capacitor Cst. Here, a high level period of the j-th compensation scan signal SCj may be referred to as a compensation period of the pixel PXij.

Meanwhile, the j-th black scan signal SBj is activated in the second activation period AP2 of the j-th compensation scan signal SCj. The j-th black scan signal SBj has a low level during the activation period AP3 (hereinafter, a third activation period). During the third activation period AP3, the seventh transistor T7 receives the low-level j-th black scan signal SBj through the j-th black scan line SBLj to be turned on. A portion of the driving current Id may escape through the seventh transistor T7 as a bypass current Ibp. The third activation period AP3 may overlap the second activation period AP2. A duration of the second activation period AP2 may be greater than a duration of the third activation period AP3. The third activation period AP3 precedes the fourth activation period AP4 and may not overlap the fourth activation period AP4.

When the pixel PXij displays a black image, the pixel PXij cannot normally display the black image when the light emitting element ED emits light even though a minimum driving current of the first transistor T1 flows as the driving current Id. Accordingly, the seventh transistor T7 in the pixel PXij according to some embodiments of the present disclosure may distribute a portion of the minimum driving current of the first transistor T1, as a bypass current Ibp, to a current path other than the current path toward the light emitting element ED. Here, the minimum driving current of the first transistor T1 means a current that flows to the first transistor T1 under a condition, in which that a gate-source voltage Vgs of the first transistor T1 is less than the threshold voltage Vth so that the first transistor T1 is turned off. The minimum driving current (for example, a current of 10 pA or less) that flows through the first transistor T1 under the condition of turning off the first transistor T1 is transmitted to the light emitting element ED, and a black grayscale image is displayed. It may be seen that when the pixel PXij displays a black image, the influence of the bypass current Ibp on the minimum driving current is relatively large, whereas when the pixel PXij displays an image such as a normal image or a white image, the influence of the bypass current Ibp on the minimum driving current ID is little. Accordingly, when a black image is displayed, the current (i.e., the light emission current Ied) reduced by the current amount of the bypass current Ibp that exits from the driving current ID through the seventh transistor T7 may be provided from the light emitting element ED so that a black image may be expressed clearly. Accordingly, the pixel PXij may implement an accurate black grayscale image by using the seventh transistor T7, and as a result, a contrast ratio may be relatively improved.

Next, the j-th light emission control signal EMj supplied from the j-th light emission control line EMLj is changed from a high level to a low level. The fifth and sixth transistors T5 and T6 are turned on by the light emission control signal EMj of a low level. Then, a driving current ID is generated according to the voltage difference between the voltage of the third electrode of the first transistor T1 and the first driving voltage ELVDD, and the driving current Id is supplied to the light emitting element ED through the sixth transistor T6 so that a light emission current led flows in the light emitting element ED.

Referring back to FIG. 4A, the sensor FXdj is electrically connected to a d-th read-out line RLd, the j-th write scan line SWLj, and a reset control line SRL, among the read-out lines RL1 to RLh.

The sensor FXdj includes a light receiving element OPD and a sensor driving circuit O_SD. According to some embodiments of the present disclosure, the light receiving element OPD may be an organic photodiode containing an organic material as a photoelectric conversion layer. FIG. 4A illustrates, by way of example, a structure, in which the sensor FXdj includes one light receiving element, but the present disclosure is not limited thereto. For example, the sensor FXdj may include a plurality of light receiving elements OPD that are connected to each other in parallel.

The anode electrode of the light receiving element OPD may be connected to the first sensing node SN1, and the cathode electrode of the light receiving element OPD may be connected to a second driving voltage line VL2 that transmits the second driving voltage ELVSS. The cathode electrode of the light receiving element OPD may be electrically connected to the cathode electrode of the light emitting element ED. According to some embodiments of the present disclosure, the cathode electrode of the light receiving element OPD may be formed integrally with the cathode electrode of the light emitting element ED to form a common cathode electrode C_CE (see FIG. 6).

The sensor driving circuit O_SD includes three transistors ST1 to ST3. The three transistors ST1 to ST3 may be a reset transistor ST1, an amplification transistor ST2, and an output transistor ST3, respectively. At least one of the reset transistor ST1, the amplification transistor ST2, or the output transistor ST3 may be an oxide semiconductor transistor. According to some embodiments of the present disclosure, the reset transistor ST1 may be an oxide semiconductor transistor, and the amplification transistor ST2 and output transistor ST3 may be LTPS transistors. However, the present disclosure is not limited thereto, and at least the reset transistor ST1 and the output transistor ST3 may be oxide semiconductor transistors, and the amplification transistor ST2 may be an LTPS transistor.

Furthermore, some of the reset transistor ST1, the amplification transistor ST2, and the output transistor ST3 may be P-type transistors, and some may be N-type transistors. According to some embodiments of the present disclosure, the amplification transistor ST2 and the output transistor ST3 may be a PMOS transistor, and the reset transistor ST1 may be an NMOS transistor. However, the present disclosure is not limited thereto, and the reset transistor ST1, the amplification transistor ST2, and the output transistor ST3 may all be N-type transistors or may all be P-type transistors.

Some (for example, the reset transistor ST1) of the reset transistor ST1, the amplification transistor ST2, and the output transistor ST3 may be of the same type as the third and fourth transistors T3 and T4 of the pixel PXij. The amplification transistor ST2 and the output transistor ST3 may be the same type as the first, second, fifth to eighth transistors T1, T2, and T5 to T8 of the pixel PXij.

The circuit configuration of the sensor driving circuit O_SD according to the present disclosure is not limited to FIG. 4A. The sensor driving circuit O_SD illustrated in FIG. 4A is only an example, and the configuration of the sensor driving circuit O_SD may be modified and implemented.

The reset transistor ST1 includes a first electrode that receives the reset voltage Vrst, a second electrode that is connected to the first sensing node SN1, and a third electrode that receives a reset control signal SR. The reset transistor ST1 may reset a potential of the first sensing node SN1 to the reset voltage Vrst in response to the reset control signal SR. The reset control signal SR may be a signal that is provided through the reset control line SRL. However, the present disclosure is not limited thereto. Alternatively, the reset control signal SR may be the j-th compensation scan signal SCj that is supplied through the j-th compensation scan line SCLj. That is, the reset transistor ST1 may receive the j-th compensation scan signal SCj supplied from the j-th compensation scan line SCLj as the reset control signal SR. According to some embodiments of the present disclosure, the reset voltage VRst may have a voltage level that is lower than the second driving voltage ELVSS at least during the activation period of the reset control signal SR. The reset voltage VRst may be transmitted to the sensor FXdj through a reset voltage line VRL. The reset voltage Vrst may be a DC voltage maintained at a voltage level that is lower than the second driving voltage ELVSS.

The reset transistor ST1 may include a plurality of sub-reset transistors that are connected to each other in series. For example, the reset transistor ST1 may include two sub-reset transistors (hereinafter, referred to as first and second sub-reset transistors). In this case, the third electrode of the first sub-reset transistor and the third electrode of the second sub-reset transistor are connected to the reset control line SRL. Furthermore, the second electrode of the first sub-reset transistor and the first electrode of the second sub-reset transistor may be electrically connected to each other. Furthermore, a reset voltage VRst may be applied to the first electrode of the first sub-reset transistor, and the second electrode of the second sub-reset transistor may be electrically connected to the first sensing node SN1. However, the number of sub-reset transistors is not limited thereto, and may be modified in various ways.

The amplification transistor ST2 includes a first electrode that receives a sensing driving voltage SLVD, a second electrode that is connected to a second sensing node SN2, and a third electrode that is connected to the first sensing node SN1. The amplification transistor ST2 may be turned on according to the potential of the first sensing node SN1 to apply the sensing driving voltage SLVD to the second sensing node SN2. According to some embodiments of the present disclosure, the sensing driving voltage SLVD may be one of a first driving voltage ELVDD and first and second initialization voltage Vint and Vaint. When the sensing driving voltage SLVD is the first driving voltage ELVDD, the first electrode of the amplification transistor ST2 may be electrically connected to the first driving voltage line VL1. When the sensing driving voltage SLVD is the first initialization voltage Vint, the first electrode of the amplification transistor ST2 may be electrically connected to the first initialization voltage line VIL, and when the sensing driving voltage SLVD is the second initialization voltage Vaint, the first electrode of the amplification transistor ST2 may be electrically connected to the second initialization voltage line VAIL.

The output transistor ST3 includes a first electrode that is connected to the second sensing node SN2, a second electrode that is connected to the d-th read-out line RLd, and a third electrode that receives an output control signal. The output transistor ST3 may transmit a sensing signal FSD to the d-th read-out line RLD in response to the output control signal. The output control signal may be the j-th write scan signal SWj supplied through the j-th write scan line SWLj. That is, the output transistor ST3 may receive the j-th write scan signal SWj supplied from the write scan line SWLj as an output control signal.

The light receiving element OPD of the sensor FXdj may be exposed to light during a light emission period of the light emitting element ED. The light may be light that is output from a light emitting element ED.

When a hand US_F (see FIG. 1) of the user touches the display surface IS (see FIG. 1), the light receiving element OPD generates photo charges corresponding to the light reflected by ridges of a fingerprint or valleys of the ridges. An amount of current that flows through the light receiving element OPD varies depending on the generated photocharges. The current that flows through the light receiving element OPD when the light receiving element OPD receives the light reflected by the ridges of the fingerprint may be referred to as a first current, and the current that flows through the light receiving element OPD when the light receiving element OPD receives the light reflected by the ridges of the fingerprint may be referred to as a second current. Because the amount of light reflected by the ridges of the fingerprint and the light reflected by the valleys of the fingerprint are different, this difference in the amount of light appears as a difference between the first and second currents. When the first current flows through the light receiving element OPD, a potential of the first sensing node SN1 may be referred to as a first potential, and when the second current flows through the light receiving element OPD, a potential of the first sensing node SN1 may be referred to as the second potential. According to some embodiments of the present disclosure, the first current may be greater than the second current, and in this case, the first potential may be lower than the second potential.

The amplification transistor ST2 may be a source follower amplifier that generates source-drain current in proportion to the potential of the first sensing node SN1 input to the third electrode.

During the fourth activation period AP4, the j-th write scan signal SWj of a low level is supplied to the output transistor ST3 through the j-th write scan line SWLj. When the output transistor ST3 is turned on in response to the j-th write scan signal SWj of a low level, the sensing signal FSD corresponding to the current that flows through the amplification transistor ST2 is output to the d-th read-out line RLD.

Next, during the reset period, when a reset control signal SR of a high level is supplied through the reset control line SRL, the reset transistor ST1 is turned on. The reset period may be defined as an activation period (i.e., a high level period of the reset control signal SR. Alternatively, when the reset transistor ST1 includes a P-type transistor, a reset control signal SR of a low level may be supplied to the reset control line SRL during the reset period. During the reset period, the first sensing node SN1 may be reset to a potential corresponding to the reset voltage Vrst. According to some embodiments of the present disclosure, the reset voltage VRst may have a voltage level that is lower than the second driving voltage ELVSS.

Next, when the reset period ends, the light receiving element OPD generates photo charges corresponding to the received light, and the generated photo charges may be accumulated in the first sensing node SN1.

Referring to FIG. 4B, the non-effective sensor NFXdj may be connected to the vertical connection lines V_CL corresponding to the non-effective sensor NFXdj. The non-effective sensor NFXdj may include a dummy light receiving element OPDa and a dummy sensor driving circuit O_SDa.

The dummy sensor driving circuit (or a second sensor driving circuit) O_SDa includes three dummy transistors ST1*a* to ST3*a*. The three dummy transistors ST1*a* to ST3*a* may be a dummy reset transistor ST1*a*, a dummy amplification transistor ST2*a*, and a dummy output transistor ST3*a*, respectively. Because the circuit configuration of the dummy sensor driving circuit O_SDa is the same as that of the sensor driving circuit O_SD illustrated in FIG. 4A, a detailed description thereof will be omitted.

The second electrode of the dummy output transistor ST3*a* is located adjacent to a d-th vertical connection line V_CLd, but may be electrically separated therefrom. Accordingly, even though the dummy output transistor ST3*a* is turned on in response to the output control signal, the sensing signal FSd (see FIG. 4A) output from the second electrode of the dummy output transistor ST3*a* cannot be transmitted to the d-th vertical connection line V_CLd. FIG. 4B illustrates a case, in which the dummy sensor driving circuit O_SDa and the d-th vertical connection line V_CLd are electrically separated from each other, but the present disclosure is not limited thereto. For example, the second electrode of the dummy output transistor ST3*a* may be electrically connected to the d-th vertical connection line V_CLd. In this case, the dummy light receiving element OPDa does not include a photoelectric conversion layer, and thus, it does not react to light or blocks the light supplied to the dummy light receiving element OPDa whereby the sensing signal FSd (see FIG. 4A) cannot be transmitted to the d-th vertical connection line V_CLd. However, the present disclosure is not limited thereto, and the sensor driving circuit O_SDa may not include the output transistor ST3.

Figure 5:
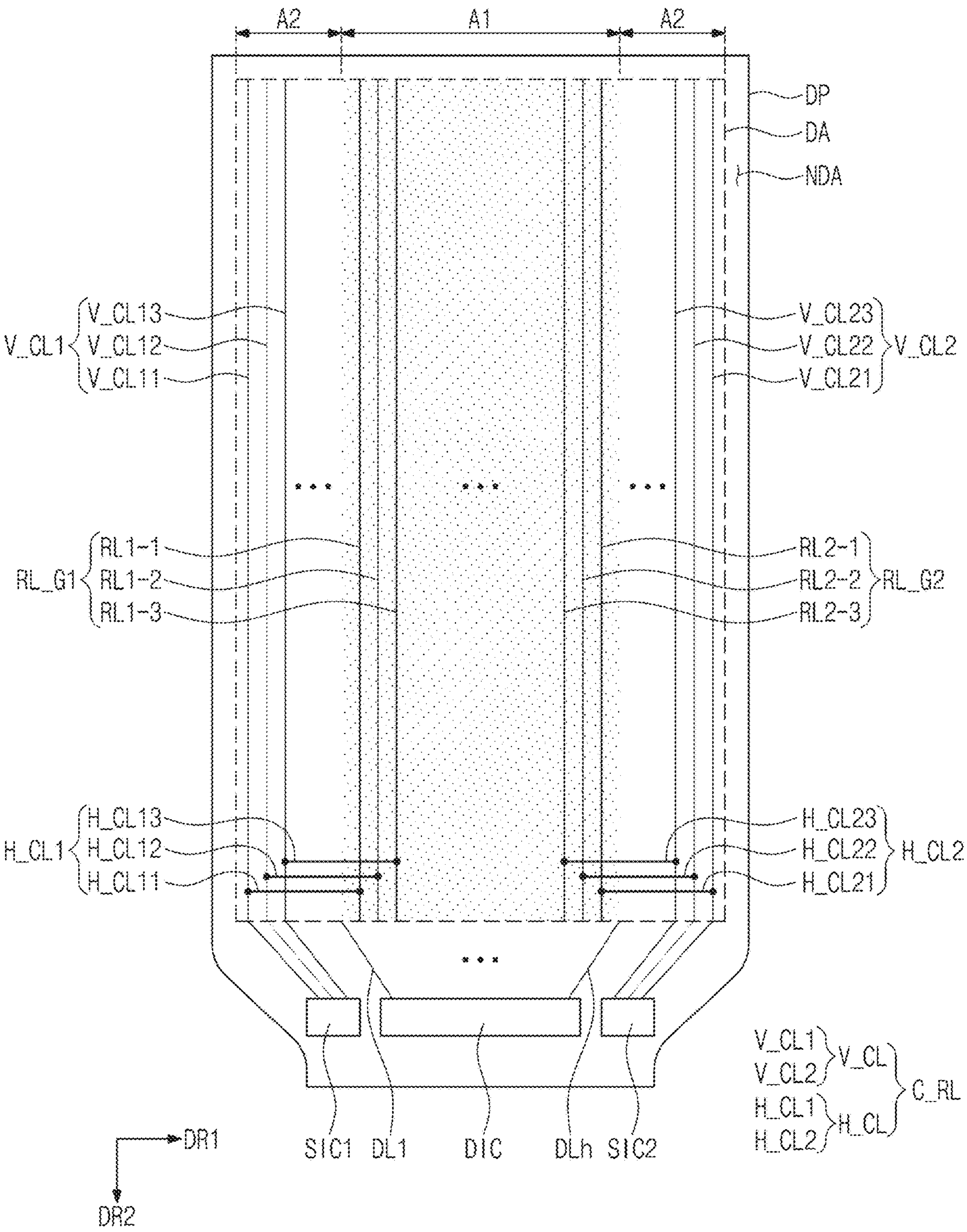
FIG. 5 is a plan view of a display panel according to some embodiments of the present disclosure.

FIG. 5 is a plan view of a display panel according to some embodiments of the present disclosure. However, for convenience of description, scan lines are omitted, and only read-out lines and connection lines are illustrated in FIG. 5.

Referring to FIG. 5, the display panel DP includes a display area DA and a non-display area NDA. A plurality of pixels PX (see FIG. 3), a plurality of effective sensors FX (see FIG. 3), and a plurality of non-effective sensors NFX (see FIG. 3) are located in the display area DA. The driving chip DIC and the sensor chips SIC1 and SIC2 are mounted in the non-display area NDA. The read-out lines RL1 to RLh (see FIG. 3) are connected to a plurality of effective sensors FX in the display area DA, and are connected to the sensor chips SIC1 and SIC2 in the non-display area NDA. The display area DA may include a first area A1 and a second area A2. The first area A1 may be referred to as a sensing area, and the second area A2 may be referred to as a non-sensing area.

The read-out lines RL1 to RLh (see FIG. 3) may be divided into a first group and a second group. The first group includes a plurality of first read-out lines RL_G1 connected to the first sensor chip SIC1, and the second group includes a plurality of second read-out lines RL_G2 connected to the second sensor chip SIC2. The plurality of first read-out lines RL_G1 and the plurality of second read-out lines RL_G2 extend in the second direction DR2, and are arranged in the first direction DR1. The plurality of first read-out lines RL_G1 are spaced apart from the second read-out lines RL_G2 in the first direction DR1.

A plurality of first read-out lines RL_G1 are connected to the sensor driving circuit O_SD (see FIG. 4A) of the first group of sensors, among the plurality of effective sensors FX, and a plurality of second read-out lines RL_G2 are connected to the sensor driving circuit O_SD (see FIG. 4A) of the second group of sensors, among the plurality of effective sensors FX. The first read-out lines RL_G1 and the second read-out lines RL_G2 are located in the first area A1. That is, an area, in which the plurality of effective sensors FX are located, may be defined as a first area A1.

The plurality of first read-out lines RL_G1 includes (1-1)-th to (1-3)-th read-out lines RL1-1 to RL1-3, and the plurality of second read-out lines RL_G2 includes the (2-1)-th to (2-3)-th read-out lines RL2-1 to RL2-3.

The display panel DP further includes connection line parts C_RL that electrically connect the first read-out lines RL_G1 and second read-out lines RL_G2 to the sensor chips SIC1 and SIC2. The connection line parts C_RL include a plurality of vertical connection lines V_CL that extend along the second direction DR2 and a plurality of horizontal connection lines H_CL that extend along the first direction DR1. Meanwhile, the vertical connection lines V_CL may be referred to as first connection lines, and the horizontal connection lines H_CL may be referred to as second connection lines.

The vertical connection lines V_CL may include first vertical connection lines V_CL1 that are electrically connected to the first sensor chip SIC1, and second vertical connection lines V_CL2 that are electrically connected to the second sensor chip SIC2. The plurality of first vertical connection lines V_CL1 and the plurality of second vertical connection lines V_CL2 are located adjacent to the plurality of non-effective sensors NFX, but is electrically separated from the dummy sensor driving circuit O_SDa (see FIG. 4B). An area, in which the plurality of non-effective sensors NFX are located, may be defined as the second area A2. That is, the first area A1, in which the plurality of effective sensors FX are located, may perform a sensing function and may be defined as a sensing area, and the second area A2, in which the plurality of non-effective sensors NFX are located, cannot perform the sensing function and may therefore be defined as a non-sensing area.

The first and second vertical connection lines V_CL1 and V_CL2 may be located in the second area A2. The first vertical connection lines V_CL1 may include (1-1)-th to (1-3)-th vertical connection lines V_CL11, V_CL12, and V_CL13, and the second vertical connection lines V_CL2 may include (2-1)-th to (2-3)-th vertical connection lines V_CL21, V_CL22, and V_CL23.

The horizontal connection lines H_CL electrically connect the vertical connection lines V_CL to the first read-out lines RL_G1 and the second read-out lines RL_G2. The horizontal connection lines H_CL includes first horizontal connection lines H_CL1 that are connected to the (1-1)-th to (1-3)-th read-out lines RL1-1 to RL1-3, respectively, and the second horizontal connection lines H_CL2 that connecting the second vertical connection lines V_CL2 to the (2-1)-th to (2-3)-th read-out lines RL2-1 to RL2-3, respectively. The first horizontal connection lines H_CL1 may include (1-1)-th to (1-3)-th horizontal connection lines H_CL11, H_CL12, and H_CL13, and the second horizontal connection lines H_CL2 include (2-1)-th to (2-3)-th horizontal connection lines H_CL21, H_CL22, and H_CL23.

The data lines DL1 to DLm may be connected to a driving chip DIC located in the non-display area NDA. Data lines DL1 to DLM may be located in the display area DA and the non-display area NDA. The data lines DL1 to DLM located in the non-display area NDA may not overlap the vertical connection lines V_CL located in the non-display area NDA.

Portions of the vertical connection lines V_CL and the plurality of horizontal connection lines H_CL may be located in the display area DA. That is, portions of the connection lines for connecting the read-out lines RL1 to RLh and the first and second sensor chips SIC1 and SIC2 are located in the display area DA. Furthermore, the data lines DL1 to DLM located in the non-display area NDA may not overlap the vertical connection lines V_CL located in the non-display area NDA. Accordingly, an extent of the area occupied by the connection lines in the non-display area NDA may be decreased, and as a result, an extent of a dead space of the display panel DP may be decreased.

Figure 6:
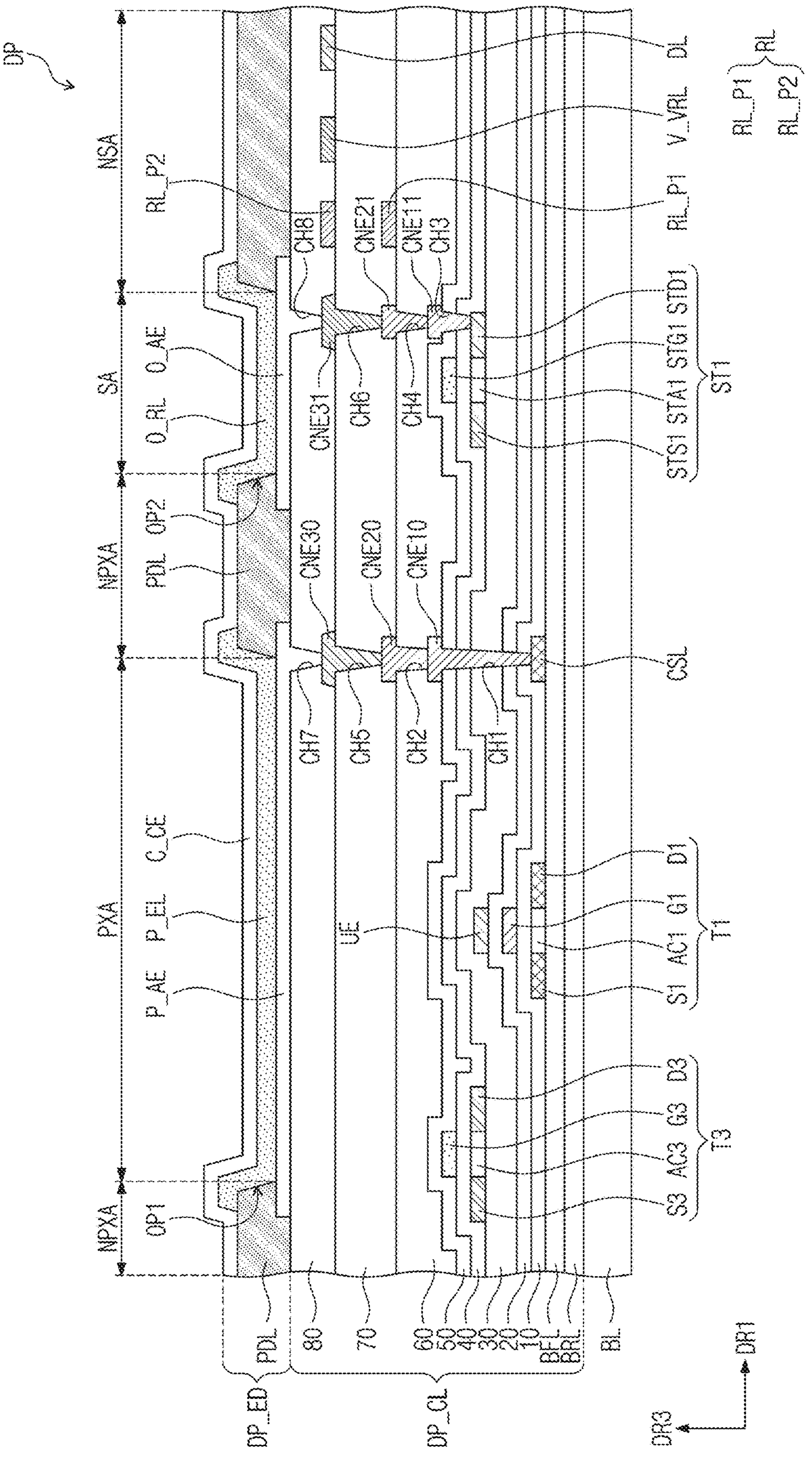
FIG. 6 is a cross-sectional view of a display panel according to some embodiments of the present disclosure.

FIG. 6 is a cross-sectional view of a display panel according to some embodiments of the present disclosure.

Referring to FIG. 6, the display panel DP may include a base layer BL, a circuit layer DP_CL, and an element layer DP_ED.

A display area DA (see FIG. 5) and a non-display area NDA (see FIG. 5) may be defined in the base layer BL. The base layer BL may include a synthetic resin layer. The synthetic resin layer may include a thermosetting resin. In particular, the synthetic resin layer may be a polyimide-based resin layer, and a material thereof is not particularly limited. The synthetic resin layer may include at least any one of acrylic resin, methacrylic resin, polyisoprene, vinyl resin, epoxy resin, urethane resin, cellulose resin, siloxane resin, polyamide resin, and perylene resin. In addition, the base layer may include a glass substrate, a metal substrate, or an organic/inorganic composite material substrate.

At least one inorganic layer is formed on an upper surface of the base layer BL. The inorganic layer may include at least one of aluminum oxide, titanium oxide, silicon oxide, silicon oxynitride, zirconium oxide, or hafnium oxide. The inorganic layer may be formed in multiple layers. The multilayered inorganic layers may form a barrier layer BRL and/or a buffer layer BFL, which will be described later. The barrier layer BRL and the buffer layer BFL may be selectively arranged.

The circuit layer DP_CL may include a barrier layer BRL and/or a buffer layer BFL. The barrier layer BRL prevents or reduces instances of foreign substances or contaminants being introduced from the outside. The barrier layer BRL may include a silicon oxide layer and a silicon nitride layer. They may be provided in plural numbers, and the silicon oxide layers and silicon nitride layers may be alternately stacked.

The buffer layer BFL may be located on the barrier layer BRL. The buffer layer BFL relatively improves a coupling strength between the base layer BL and the semiconductor pattern and/or the conductive pattern. The buffer layer BFL may include a silicon oxide layer and a silicon nitride layer. The silicon oxide layers and the silicon nitride layers may be alternately laminated.

A semiconductor pattern is located on the buffer layer BFL. Hereinafter, the semiconductor pattern directly located on the buffer layer BFL is defined as a first semiconductor pattern. The first semiconductor pattern may include a silicon semiconductor. The first semiconductor pattern may include polysilicon. However, the present disclosure is not limited thereto, and the first semiconductor pattern may include amorphous silicon.

FIG. 6 only illustrates a portion of the first semiconductor pattern, and the first semiconductor pattern may be further located in another area of the pixel PXij (see FIG. 4A). The first semiconductor pattern has different electrical properties depending on whether it is doped or not. The first semiconductor pattern may include a doping area and a non-doping area. The doping area may be doped with an N-type dopant or a P-type dopant. The P-type transistor includes a doping area that is doped with a P-type dopant, and the N-type transistor includes a doping area that is doped with an N-type dopant.

The doping area has a conductivity that is higher than that of the non-doping area, and essentially serves as an electrode or signal line. The non-doping area substantially corresponds to the active (or a channel) of the transistor. In other words, a portion of the first semiconductor pattern may be the active of the transistor, another portion thereof may be a source or drain of the transistor, and another portion thereof may be a connection signal line (or connection electrode).

As illustrated in FIG. 6, a first electrode S1, a channel portion AC1, and a second electrode D1 of the first transistor T1 are formed from the first semiconductor pattern. The first electrode S1 and the second electrode D1 of the first transistor T1 extend in opposite directions from the channel portion AC1.

FIG. 6 illustrates a portion of a connection signal line CSL formed from a semiconductor pattern. Although not separately illustrated, the connection signal line CSL may be connected to the second electrode of the sixth transistor T6 (see FIG. 4A) on a plane.

A first insulating layer 10 is located on the buffer layer BFL. The first insulating layer 10 commonly overlaps a plurality of pixels PX (see FIG. 3), and covers the first semiconductor pattern. The first insulating layer 10 may be an inorganic layer and/or an organic layer, and may have a single-layer or a multilayer structure. The first insulating layer 10 may include at least one of aluminum oxide, titanium oxide, silicon oxide, silicon oxynitride, zirconium oxide, or hafnium oxide. According to some embodiments, the first insulating layer 10 may be a single layer of silicon oxide. The insulating layer of the circuit layer DP_CL, which will be described later, as well as the first insulating layer 10 may be an inorganic layer and/or an organic layer, and may have a single-layer or multilayer structure. The inorganic layer may include at least one of the materials described above.

A third electrode G1 of the first transistor T1 is located on the first insulating layer 10. The third electrode G1 may be a portion of a first gate pattern layer GAT1 (see FIG. 11C). The third electrode G1 of the first transistor T1 overlaps the channel part AC1 of the first transistor T1. In a process of doping the first semiconductor pattern, the third electrode G1 of the first transistor T1 may serve as a mask.

A second insulating layer 20 that covers the third electrode G1 is located on the first insulating layer 10. The second insulating layer 20 commonly overlaps the plurality of pixels PX. The second insulating layer 20 may be an inorganic layer and/or an organic layer, and may have a single-layer or a multilayer structure. According to some embodiments, the second insulating layer 20 may be a single layer of silicon oxide.

An upper electrode UE may be located on the second insulating layer 20. The upper electrode UE may overlap the third electrode G1. The upper electrode UE may be a portion of a second gate pattern layer GAT2 (see FIG. 11D) or a portion of a doped semiconductor pattern. A portion of the third electrode G1 and the upper electrode UE that overlaps it may define a capacitor Cst (see FIG. 4A). According to some embodiments of the present disclosure, the upper electrode UE may be omitted.

According to some embodiments of the present disclosure, the second insulating layer 20 may be replaced with an insulating pattern. The upper electrode UE is located on the insulating pattern. The upper electrode UE may serve as a mask for forming an insulating pattern from the second insulating layer 20.

A third insulating layer 30 that covers the upper electrode UE is located on the second insulating layer 20. According to some embodiments, the third insulating layer 30 may be a single layer of silicon oxide. A semiconductor pattern is located on the third insulating layer 30. Hereinafter, the semiconductor pattern directly located on the third insulating layer 30 is defined as a second semiconductor pattern. The second semiconductor pattern may include metal oxide. The oxide semiconductor may include a crystalline or amorphous oxide semiconductor. For example, the oxide semiconductors may include a material oxide, such as zinc (Zn), indium (In), gallium (Ga), tin (Sn), or titanium (Ti), or a mixture of a metal, such as zinc (Zn), indium (In), and gallium (Ga), tin (Sn), or titanium (Ti), and oxides thereof. The oxide semiconductor may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), or zinc-tin oxide (ZTO).

FIG. 6 only illustrates a portion of the second semiconductor pattern, and the second semiconductor pattern may be further located in another area of the pixel PXij. The second semiconductor pattern may include a plurality of areas that are divided depending on whether the metal oxide has been reduced. An area (hereinafter, referred to as a reduction area), in which the metal oxide is reduced, has a conductivity that is higher than that of an area (hereinafter, referred to as a non-reduction area), in which the metal oxide is not reduced. The reduction area essentially serves as an electrode or signal line. The non-reduction area actually corresponds to a channel part of the transistor. In other words, a portion of the second semiconductor pattern may be a channel part of the transistor, and another portion thereof may be the first electrode or the second electrode of the transistor.

The circuit layer DP_CL may further include a portion of the semiconductor pattern of the sensor driving circuit O_SD (see FIG. 4A). For convenience of description, the reset transistor ST1 in the semiconductor pattern of the sensor driving circuit O_SD is illustrated. A first electrode STS1, a channel part STA1, and a second electrode STD1 of the reset transistor ST1 are formed from the second semiconductor pattern. According to some embodiments of the present disclosure, the second semiconductor pattern may include a metal oxide. The first electrode STS1 and the second electrode STD1 include metal that is reduced from a metal oxide semiconductor. The first electrode STS1 and the second electrode STD1 may have a specific thickness from an upper surface of the second semiconductor pattern, and may include a metal layer including the reduced metal.

A fourth insulating layer 40 is arranged to cover the first electrode STS1, the channel part STA1, and the second electrode STD1 of the first reset transistor ST1. A third electrode STG1 of the first reset transistor ST1 is located on the fourth insulating layer 40. According to some embodiments, the third electrode STG1 may be a portion of a third gate pattern layer GAT3 (see FIG. 11F). The third electrode STG1 of the reset transistor ST1 overlaps a channel part STA1 of the first reset transistor ST1. According to some embodiments, one third electrode STG1 is illustrated for convenience of description, but the first reset transistor ST1 may include two third electrodes.

A fifth insulating layer 50 that covers a third electrode G3 is located on the fourth insulating layer 40. According to some embodiments, the fifth insulating layer 50 may include a silicon oxide layer and a silicon nitride layer. The fifth insulating layer 50 may include a plurality of silicon oxide layers and silicon nitride layers that are alternately laminated.

At least one insulating layer is further located on the fifth insulating layer 50. According to some embodiments, a sixth insulating layer 60 and a seventh insulating layer 70 may be located on the fifth insulating layer 50. The sixth insulating layer 60 and the seventh insulating layer 70 may be organic layers, and may have a single-layer or multilayer structure. The sixth insulating layer 60 and the seventh insulating layer 70 may be a single-layer polyimide-based resin layer. Without being limited thereto, the sixth insulating layer 60 and the seventh insulating layer 70 may include at least any one of acrylic resin, methacrylic resin, polyisoprene resin, vinyl resin, epoxy resin, urethane resin, cellulose resin, and siloxane resin, polyamide-based resin, and perylene-based resin.

A first connection electrode CNE10 may be located on the fifth insulating layer 50. The first connection electrode CNE10 is connected to the connection signal line CSL through a first contact hole CH1 that passes through the first to fifth insulating layers 10 to 50. A second connection electrode CNE20 may be connected to the first connection electrode CNE10 through a second contact hole CH2 that passes through the sixth insulating layer 60. According to some embodiments of the present disclosure, at least any one of the fifth insulating layer 50 to the seventh insulating layer 70 may be omitted, and one of the first and second connection electrodes CNE10 and CNE20 may also be omitted.

A third connection electrode CNE11 may be further located on the fifth insulating layer 50. The third connection electrode CNE11 is connected to the second electrode STD1 of the reset transistor ST1 through a third contact hole CH3 that passes the fourth and fifth insulating layers 40 and 50. A fourth connection electrode CNE21 may be connected to the third connection electrode CNE11 through a fourth contact hole CH4 that passes the sixth insulating layer 60.

The first and third connection electrodes CNE10 and CNE11 may be portions of the first data metal pattern, and the second and fourth connection electrodes CNE20 and CNE21 may be portions of the second data metal pattern.

The horizontal connection lines H_CL (see FIG. 5) may be located on the same layer (i.e., the fifth insulating layer 50) as the first and third connection electrodes CNE10 and CNE11. However, the present disclosure is not limited thereto. The horizontal connection lines H_CL may be located on the same layer (i.e., the first insulating layer 10) as the first electrode G1 of the first transistor T1.

A portion of a read-out wiring line RL (i.e., a first line part RL_P1) may be located on the same layer (i.e., the sixth insulating layer 60) as the second and fourth connection electrodes CNE20 and CNE21. The read-out wiring line RL may be one of the read-out lines RL1 to RLh illustrated in FIG. 3. The second and fourth connection electrodes CNE20 and CNE21, and the first line part RL_P1 of the read-out wiring line RL are covered by the seventh insulating layer 70.

On the seventh insulating layer 70, a data line DL, vertical connection lines V_CL (see FIG. 5), a vertical reset voltage line V_VRL, and a portion (i.e., a second line partRL_P2) of the read-out wiring line RL may be located. The data line DL may be one of the data lines DL1 to DLm illustrated in FIG. 3. The vertical reset voltage line V_VRL may be included in the reset voltage line VRL illustrated in FIG. 4A.

A fifth connection electrode CNE30 and a sixth connection electrode CNE31 may be further located on the seventh insulating layer 70. The fifth connection electrode CNE30 may be connected to the second connection electrode CNE20 through the fifth contact hole CH5 that passes through the seventh insulating layer 70. The sixth connection electrode CNE31 may be connected to the fourth connection electrode CNE21 through the sixth contact hole CH6 that passes through the seventh insulating layer 70.

The data line DL, the vertical connection lines V_CL, the vertical reset voltage line V_VRL, and a second line part RL_P2 may be located on or electrically insulated from the same layer as the fifth connection electrode CNE30 and the sixth connection electrode CNE31. The data line DL, the vertical connection lines V_CL, the vertical reset voltage line V_VRL, the second line part RL_P2, the fifth connection electrode CNE30, and the sixth connection electrode CNE31 are covered by an eighth insulating layer 80.

The element layer DP_ED is located on the circuit layer DP_CL. The element layer DP_ED may include an anode electrode P_AE of a light emitting element ED (see FIG. 4A) and an anode electrode O_AE of a light receiving element OPD (see FIG. 4A). As illustrated in FIG. 6, the anode electrode P_AE of the light emitting element ED may be electrically connected to the fifth connection electrode CNE30 through the seventh contact hole CH7 that passes through the eighth insulating layer 80. The anode electrode O_AE of the light receiving element OPD may be connected to the sixth connection electrode CNE31 through the eighth contact hole CH8 that passes through the eighth insulating layer 80.

FIG. 6 illustrates a structure, in which the circuit layer DP_CL includes a fifth connection electrode CNE30 and a sixth connection electrode CNE31, but the present disclosure is not limited thereto. Alternatively, the fifth connection electrode CNE30 and the sixth connection electrode CNE31 may be omitted from the circuit layer DP_CL. In this case, the anode electrode P_AE may be directly connected to the second connection electrode CNE20, and the anode electrode O_AE may be directly connected to the fourth connection electrode CNE21.

The element layer DP_ED further includes a pixel definition layer PDL that is located on the circuit layer DP_CL. The pixel definition layer PDL may include a light emission opening OP1 that is defined in correspondence to a light emitting element ED and a light receiving opening OP2 that is defined in correspondence to a light receiving element OPD. The light emission opening OP1 exposes at least a portion of the anode electrode P_AE of the light emitting element ED. The light emission opening OP1 of the pixel definition layer PDL may define the light emission area PXA. For example, the plurality of pixels PX (see FIG. 3) may be located in a specific regularity on the plane of the display panel DP (see FIG. 3). An area, in which the plurality of pixels PX are located, may be defined as a pixel area, and one pixel area may include a light emission area PXA and a non-light emission area NPXA that is adjacent to the light emission area PXA. The non-light emission area NPXA may surround the light emission area PXA.

The light receiving opening OP2 exposes the anode electrode O_AE of the light receiving element OPD. The light receiving opening OP2 of the pixel definition layer PDL may define a light receiving area SA. For example, a plurality of sensors FX (see FIG. 3) may be located in a specific regularity on the plane of the display panel DP. An area, in which the plurality of sensors FX are located, may be defined as a sensing area, and one sensing area may include a light receiving area SA and a non-light receiving area NSA that is adjacent to the light receiving area SA. The non-light receiving area NSA may surround the light receiving area SA.

A light emission layer P_EL is arranged in response to the light emission opening OP1 defined in the pixel definition layer PDL, and a photoelectric conversion layer O_RL is provided in response to the light receiving opening OP2 defined in the pixel definition layer PDL. According to some embodiments, the patterned light emission layer P_EL is illustrated by way of example, but the present disclosure is not limited thereto. A common light emission layer may be commonly arranged in the plurality of pixels PX. Then, the common light emission layer may generate white light or blue light. A common cathode electrode C_CE is commonly connected to the light emitting element ED and the light receiving element OPD. The common cathode electrode C_CE may face an anode electrode O_AE and an anode electrode P_AE. The common cathode electrode C_CE is located on the light emission layer P_EL and the photoelectric conversion layer O_RL. The common cathode electrode C_CE is commonly located in the plurality of pixels PX and the plurality of sensors FX.

Figure 7:
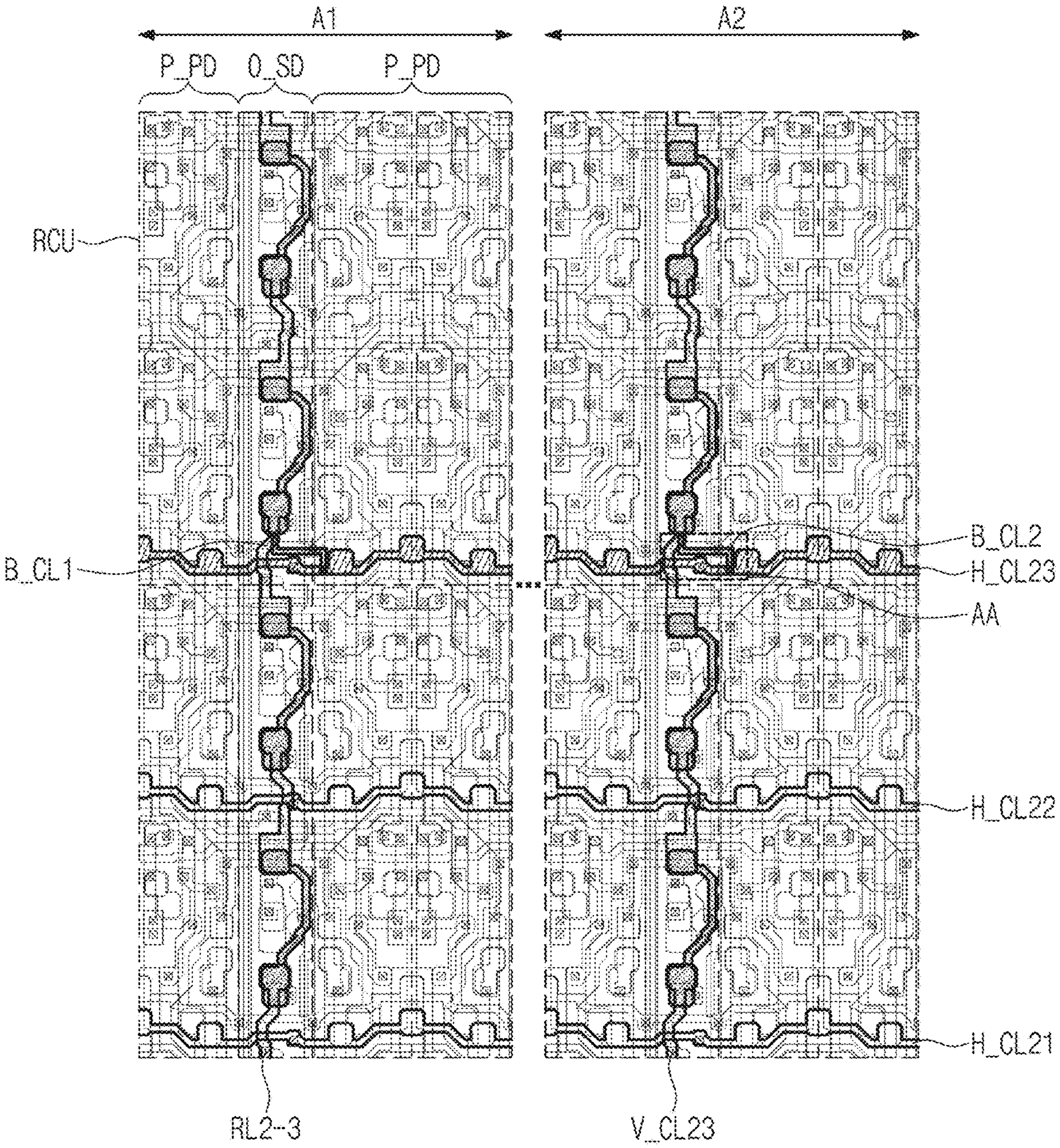
FIG. 7 is an enlarged plan view illustrating a portion of a display panel according to some embodiments of the present disclosure.

FIG. 7 is an enlarged plan view illustrating a portion of a display panel according to some embodiments of the present disclosure. On a plane, the conductive patterns and semiconductor patterns of the display panel may have a structure that is repeatedly arranged in a specific regularity. In FIG. 7, some of the pixel driving circuits P_PD and some of a sensor driving circuits O_SD are illustrated.

The circuit layer DP_CL includes a plurality of reference circuit portions RCU, and each of the reference circuit portions RCU includes at least one sensor driving circuit O_SD and at least one pixel driving circuit P_PD. FIG. 7 illustrates, by way of example, a structure, in which one reference circuit unit RCU includes one sensor driving circuit O_SD and three pixel driving circuits P_PD. However, the number of sensor driving circuits O_SD included in each of the reference circuit portions RCU, and the number of the pixel driving circuits P_PD are not particularly limited.

Referring to FIGS. 5 and 7, the display area DA of the display panel DP may be divided into a first area A1, in which the second read-out lines RL_G2 are located, and a second area A2, in which the connection line parts C_RL are located. The second area A2 is an area, in which some of the second vertical connection lines V_CL2 and the second horizontal connection lines H_CL2 connected to the second read-out lines RL_G2 are located.

FIG. 7 illustrates some of the second read-out lines RL2-1 to RL2-3, some of the second vertical connection lines V_CL2, and some of the second horizontal connection lines H_CL2. However, because the first read-out lines RL1-1 to RL1-3, the first vertical connection lines V_CL1, and the first horizontal connection lines H_CL1 also have a similar structure, a repeated description thereof will be omitted.

Among the second read-out lines RL2-1 to RL2-3, the (2-3)-th read-out line RL2-3 may be electrically connected to the corresponding (2-3)-th horizontal connection line H_CL23, among the second horizontal connection lines H_CL2, in the first area A1. Among the second read-out lines RL2-1 to RL2-3, the (2-2)-th read-out line RL2-2 may be electrically connected to the corresponding (2-2)-th horizontal connection line H_CL22, among the second horizontal connection lines H_CL2, in the first area. Furthermore, among the second read-out lines RL2-1 to RL2-3, the (2-1)-th read-out line RL2-1 may be connected to the corresponding (2-1)-th horizontal connection line H_CL21, among the second horizontal connection lines H_CL2, in the first area A1.

Referring to FIG. 7, the (2-3)-th read-out line RL2-3 may be electrically connected to the (2-3)-th horizontal connection line H_CL23 through a first bridge line B_CL1 in the first area A1. According to some embodiments, the (2-2)-th read-out line RL2-2 may be electrically connected to the (2-2)-th horizontal connection line H_CL22 through the first bridge line B_CL1 in the first area A1, and the (2-1)-th read-out line RL2-1 may be electrically connected to the (2-1)-th horizontal connection line H_CL21 through the first bridge line B_CL1 in the first area A1.

The (2-3)-th horizontal connection line H_CL23 may be electrically connected to the corresponding (2-3)-th vertical connection line V_CL23, among the second vertical connection lines V_CL2 (see FIG. 5), in the second area A2. The (2-2)-th horizontal connection line H_CL22 may be electrically connected to the corresponding (2-2)-th vertical connection line V_CL22, among the second vertical connection lines V_CL2, in the first area A1. The (2-1)-th horizontal connection line H_CL21 may be electrically connected to the corresponding (2-1)-th vertical connection line V_CL21, among the second vertical connection lines V_CL2, in the second area A2.

Referring to FIG. 7, the (2-3)-th horizontal connection line H_CL23 may be electrically connected to the (2-3)-th vertical connection line V_CL23 through a second bridge line B_CL2 in the second area A2. According to some embodiments, the (2-2)-th horizontal connection line H_CL22 may be electrically connected to the (2-2)-th vertical connection line V_CL22 through the second bridge line B_CL2 in the second area A2, and the (2-1)-th horizontal connection line H_CL21 may be electrically connected to the (2-1)-th vertical connection line V_CL21 through the second bridge line B_CL2 in the second area A2.

Figure 8A:
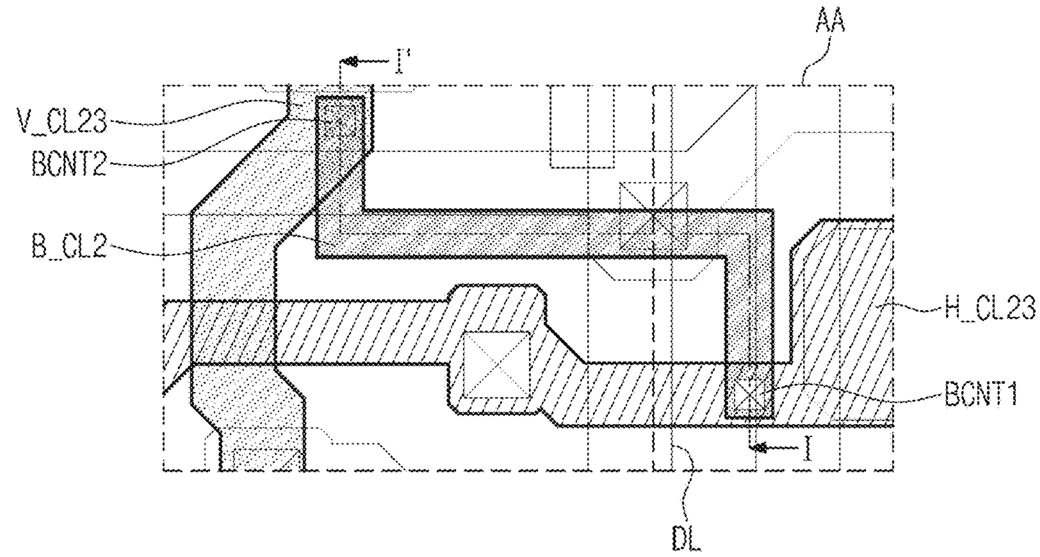
FIG. 8A is an enlarged view of portion AA illustrated in FIG. 7.
Figure 8B:
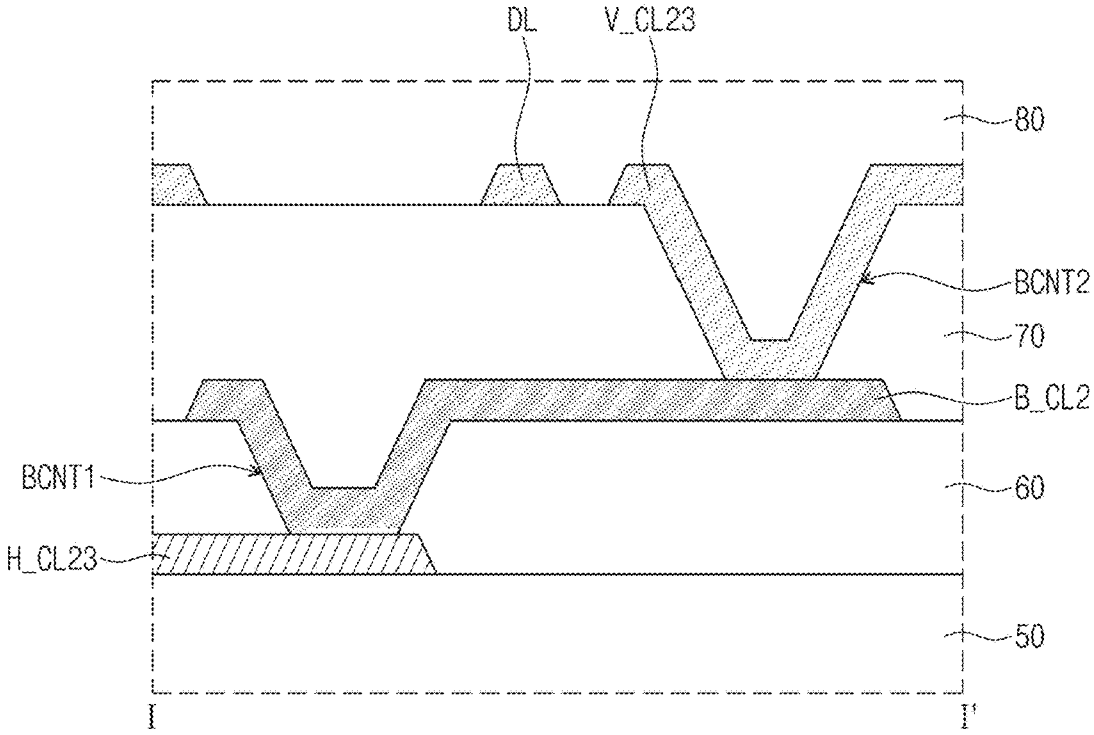
FIG. 8B is a cross-sectional view taken along the line II illustrated in FIG. 8A.

FIG. 8A is an enlarged view of portion AA illustrated in FIG. 7, and FIG. 8B is a cross-sectional view taken along line II illustrated in FIG. 8A.

Referring to FIGS. 7, 8A, and 8B, the second horizontal connection lines H_CL2 are located on a different layer from the second read-out lines RL2-1 to RL2-3, and is located on a different layer from a second vertical connection layer V_CL2.

The (2-3)-th horizontal connection line H_CL23 is located on the fifth insulating layer 50, but the (2-3)-th vertical connection line V_CL23 is located on the seventh insulating layer 70. According to some embodiments, the second read-out lines RL1-21 to RL1-23 may be located on the same layer as the second vertical connection line V_CL2.

The (2-3)-th horizontal connection line H_CL23 may be electrically connected to the (2-3)-th vertical connection line V_CL23 through the second bridge line B_CL2 in the second area A2. The second bridge line B_CL2 may be located on the sixth insulating layer 60. The second bridge line B_CL2 is directly electrically connected to the (2-3)-th horizontal connection line H_CL23 through the first bridge contact hole BCNT1 provided in the sixth insulating layer 60. The (2-3)-th vertical connection line V_CL23 is directly electrically connected to the second bridge line B_CL2 through the second bridge contact hole BCNT2 provided in the seventh insulating layer 70.

The data line DL may be located on the same layer as the (2-3)-th vertical connection line V_CL23. According to some embodiments, the shielding wiring line may be located on the same floor as the (2-3)-th vertical connection line V_CL23.

Referring to FIGS. 5 and 7 to 8B, the first read-out lines RL_G1 and second read-out lines RL_G2 located in the first area A1 may transmit a sensing signal generated from the light receiving element located in the first area A1 to the sensor chips SIC1 and SIC2, through the connection line parts C_RL. Accordingly, the first area A1, in which the first read-out lines RL_G1 and the second read-out lines RL_G2 are located, may be defined as a sensing area. However, the connection line parts C_RL connected to the light receiving element located in the second area A2 do not transmit the sensing signal generated from the light receiving element to the sensor chips SIC1 and SIC2. Accordingly, the second area A2 may be defined as a non-sensing area. Because a portion of the connection line parts C_RL is located in the display area DA, an extent of the area occupied by the connection line parts C_RL in the non-display area NDA may be decreased, and as a result, an extent of a dead space of the display panel DP may be decreased. Furthermore, because the sensing area may be freely set depending on the location and the configuration of the connection line parts C_RL, a sensing degree of freedom may be relatively improved, and a reliable display device DD (see FIG. 1) may be provided.

Figure 9A:
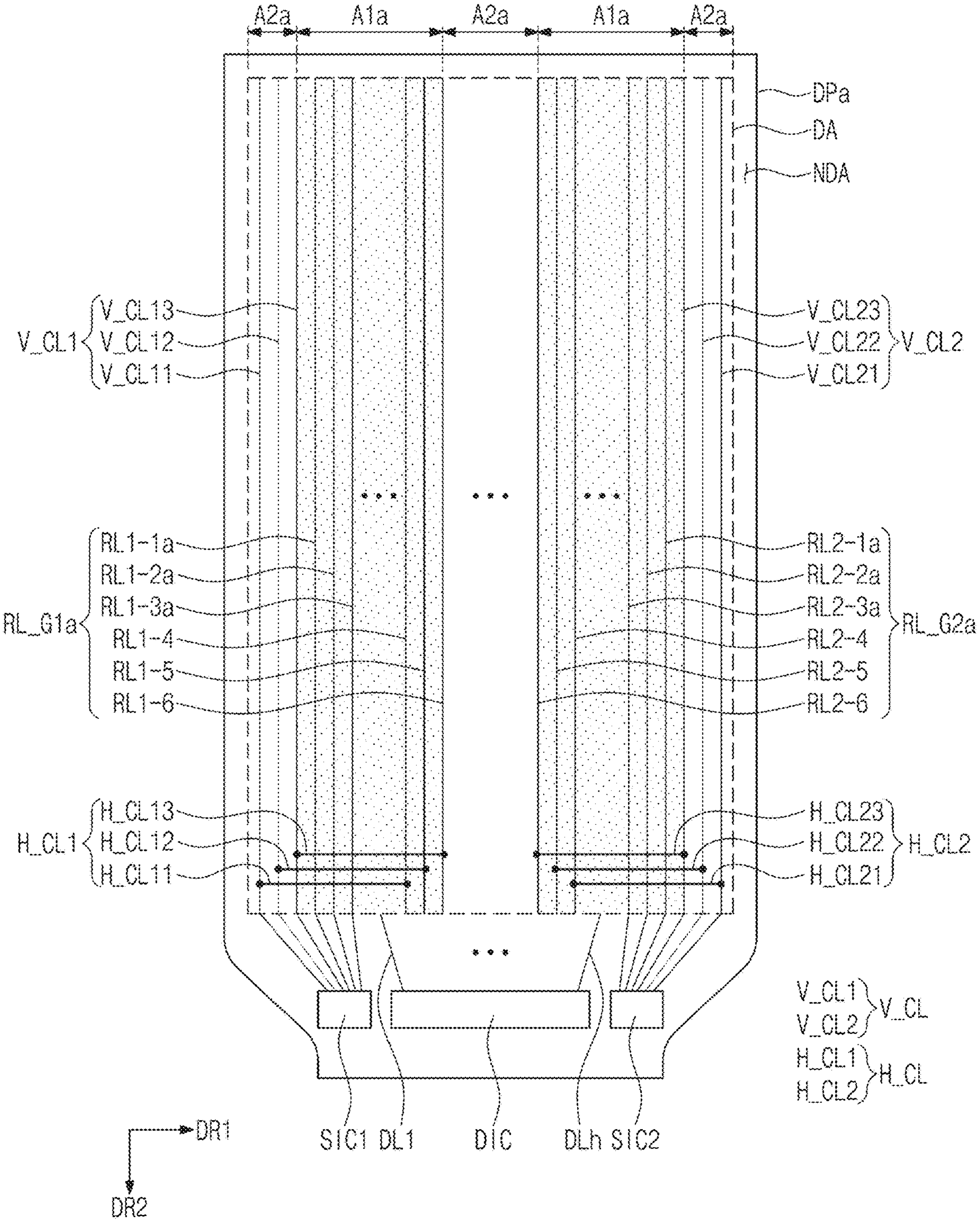
FIG. 9A is a plan view of a display panel according to some embodiments of the present disclosure.
Figure 9B:
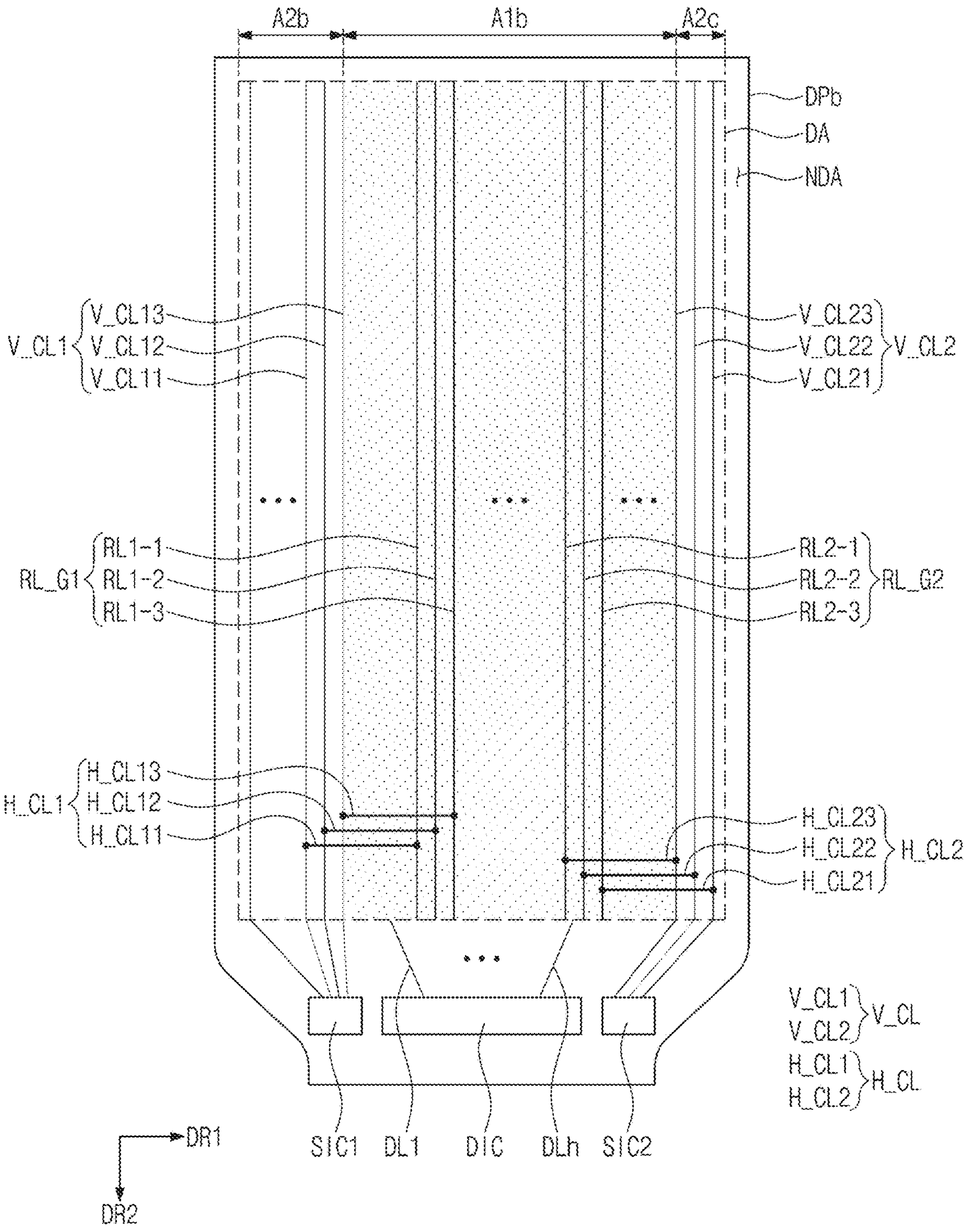
FIG. 9B is a plan view of a display panel according to some embodiments of the present disclosure.

FIG. 9A is a plan view of a display panel according to some embodiments of the present disclosure. FIG. 9B is a plan view of a display panel according to some embodiments of the present disclosure.

Referring to FIG. 9A, the display area DA may include a first area A1*a* and a second area A2*a*. As described above, the first area Ala may correspond to a sensing area and the second area A2*a* may correspond to a non-sensing area.

In the first area A1*a*, a first read-out lines RL_G1*a* connected to the first sensor chip SIC1 and a second read-out lines RL_G2*a* connected to the second sensor chip SIC2 may be located. The first read-out lines RL_G1*a* may include (1-1)-th to (1-3)-th read-out lines RL1-1*a* to RL1-3*a* that are directly connected to the first sensor chip SIC1, and (1-4)-th to (1-6)-th read-out lines RL1-4 to RL1-6 that are connected to the first sensor chip SIC1 through horizontal connection lines H_CL. The second read-out lines RL_G2*a* may include (2-1)-th to (2-3)-th read-out lines RL2-1*a* to RL2-3*a* that are directly connected to the second sensor chip SIC2, and (2-4)-th to (2-6)-th read-out lines RL2-4 to RL2-6 that are connected to the second sensor chip SIC2 through the horizontal connection lines H_CL. The first read-out lines RL_G1*a* and the second read-out lines RL_G2*a* may transmit the sending signal to the sensor chips SIC1 and SIC2. Accordingly, the first area Ala, in which the first read-out lines RL_G1*a* and the second read-out lines RL_G2*a* are located, corresponds to the sensing area.

Read-out lines that are not connected to the horizontal connection lines H_CL may be located in the second area A2*a* located between the first areas Ala that are spaced apart from each other. Accordingly, the read-out line located in the second area A2*a* corresponds to a non-sensing area because it cannot transmit the sensing signal to the sensor chips SIC1 and SIC2. Meanwhile, in the second area A2*a*, an area corresponding to the first horizontal connection lines H_CL1 may be referred to as a (2-1)-th area, an area corresponding to the second horizontal connection lines H_CL2 may be referred to as a (2-2)-th area, and an area between the (2-1)-th area and the (2-2)-th area may be referred to as a (2-3)-th area.

Referring to FIG. 9B, the display area DA may include a first area A1*b* and second areas A2*b* and A2*c*. The first area A1*b* may be located between the second areas A2*b* and A2*c* that are spaced apart from each other. The second area A2*c* is the same as the second area A2*a* described in FIG. 9A. In FIG. 9B, compared to FIG. 9A, the second area A2*b* located on a left side of the first area A1B may be larger. That is, the read-out lines that is not connected to the second sensor chip SIC2 may be more than the second areas A2*a* illustrated in FIG. 9A.

Referring to FIGS. 9A and 9B, because the sensing area may be freely set depending on the position and the configuration of the horizontal connection lines H_CLA, a display device DD (see FIG. 1) having relatively improved sensing function may be provided.

Figure 10A:
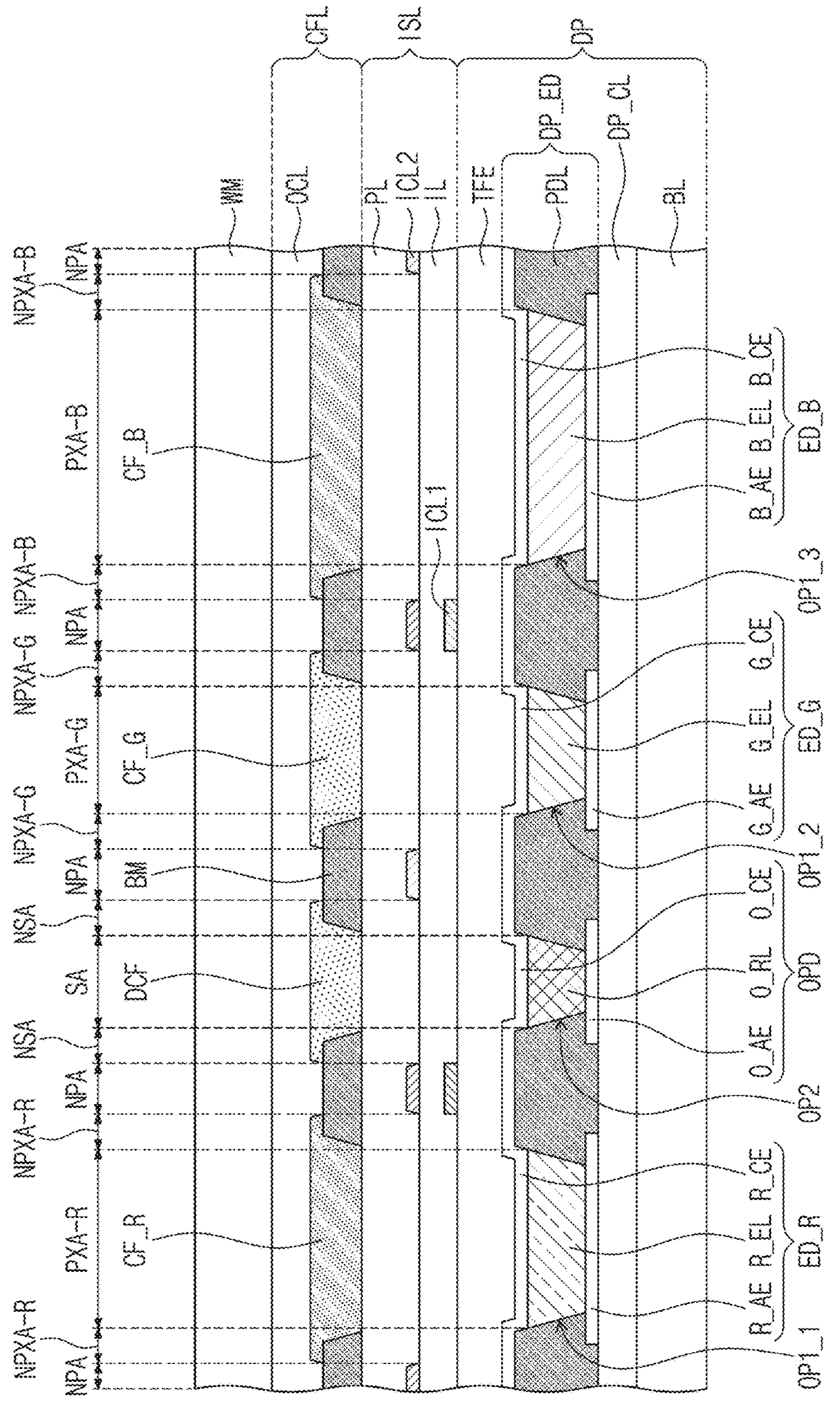
FIG. 10A is a cross-sectional view illustrating a light emitting element and a light receiving element of a display panel according to some embodiments of the present disclosure.
Figure 10B:
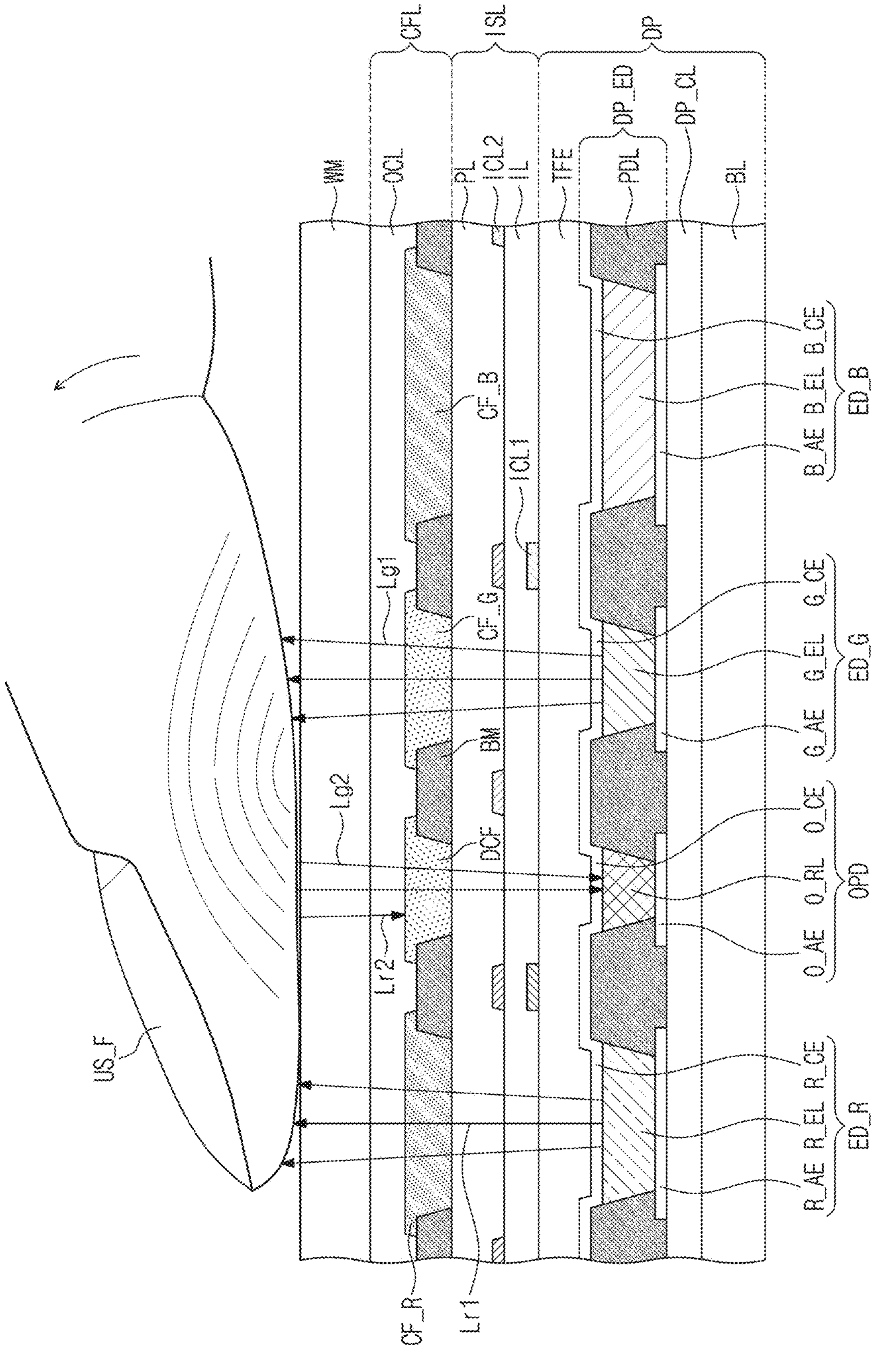
FIG. 10B is a cross-sectional view illustrating a light emitting element and a light receiving element of a display panel according to some embodiments of the present disclosure.

FIGS. 10A and 10B are cross-sectional views illustrating a light emitting element and a light receiving element of a display panel according to some embodiments of the present disclosure.

Referring to FIGS. 10A and 10B, a first electrode layer is located on the circuit layer DP_CL. A pixel definition layer PDL is formed on the first electrode layer. The first electrode layer may include red, green, and blue anode electrodes R_AE, G_AE, and B_AE. The first to third light emission openings OP1_1, OP1_2, and OP1_3 of the pixel definition layer PDL expose at least portions of the red, green, and blue anode electrodes R_AE, G_AE, and B_AE, respectively. According to some embodiments of the present disclosure, the pixel definition layer PDL may further include a black material. The pixel definition layer PDL may further include a black organic dye/pigment, such as carbon black or aniline black. The pixel definition layer PDL may be formed by mixing a blue organic material and a black organic material. The pixel definition layer PDL may further include a liquid-repellent organic material.

As illustrated in FIG. 10A, the display panel DP may include first to third light emission areas PXA-R, PXA-G, and PXA-B, and first to third non-light emission areas NPXA-R, NPXA-G, and NPXA-B that are adjacent to the first to third light emission areas PXA-R, PXA-G, and PXA-B. The non-light emission areas NPXA-R, NPXA-G, and NPXA-B may surround the corresponding light emission areas PXA-R, PXA-G, and PXA-B. According to some embodiments, the first light emission area PXA-R is defined to correspond to a partial area of the red anode electrode R_AE exposed by the first light-emitting opening OP1_1. The second light emission area PXA-G is defined to correspond to a partial area of the green anode electrode G_AE exposed by the second light-emitting opening OP1_2. The third light emission area PXA-B is defined to correspond to a partial area of the blue anode electrode B_AE exposed by the third light-emitting opening OP1_3. A non-pixel area NPA may be defined between the first to third non-emission areas NPXA-R, NPXA-G, and NPXA-B.

A light emission layer may be located on the first electrode layer. The light emission layer may include red, green, and blue light emission layers R_EL, G_EL, and B_EL. The red, green, and blue light emission layers R_EL, G1_EL, and B_EL may be located in areas corresponding to the first to third light emission openings OP1_1, OP1_2, and OP1_3, respectively. The red, green, and blue light emission layers R_EL, G_EL, and B_EL may be formed separately. Each of the red, green, and blue light emission layers R_EL, G_EL, and B_EL may include an organic material and/or an inorganic material. The red, green, and blue light emission layers R_EL, G_EL, and B_EL may generate specific colored light. For example, the red light emission layer R_EL may generate red light, the green light emission layer G_EL may generate green light, and the blue light emission layer B_EL may generate blue light.

According to some embodiments, the patterned red, green, and blue light emission layers R_EL, G_EL, and B_EL are illustrated by way of example, but one light emission layer may be commonly arranged in the first to third light emission areas PXA-R, PXA-G, and PXA-B. Then, the light emission layer may generate white light or blue light. Furthermore, the light emission layer may have a multilayer structure called tandem.

Each of the red, green, and blue light-emission layers R_EL, G_EL, and B_EL may include a low-molecular organic material or a high-molecular organic material as a light-emitting material. Alternatively, each of the red, green, and blue light emission layers R_EL, G_EL, and B_EL may include a quantum dot material as a light emitting material. A core of the quantum dot may be selected from group II-VI compounds, group III-V compounds, group IV-VI compounds, group IV elements, group IV compounds, and combinations thereof.

A second electrode layer is located on the red, green, and blue light emission layers R_EL, G_EL, and B_EL. The second electrode layer may include red, green, and blue cathode electrodes R_CE, G_CE, and B_CE. The red, green, and blue cathode electrodes R_CE, G_CE, and B_CE may be electrically connected to each other. According to some embodiments of the present disclosure, the red, green, and blue cathode electrodes R_CE, G_CE, and B_CE may have an integral shape. In this case, the red, green, and blue cathode electrodes R_CE, G_CE, and B_CE may be commonly in the first to third light emission areas PXA-R, PXA-G, and PXA-B and the non-pixel area NPA.

The element layer DP_ED may further include a light receiving element OPD. The light receiving element OPD may be a photo diode. The pixel definition layer PDL may further include a light receiving opening OP2 that is provided in response to the light receiving element OPD.

The light receiving element OPD may include a sensing anode electrode O_AE, a photoelectric conversion layer O_RL, and a sensing cathode electrode O_CE. The sensing anode electrode O_AE may be located on the same layer as the first electrode layer. That is, the sensing anode electrode O_AE may be located on the circuit layer DP_CL and may be formed simultaneously through the same process as that of the red, green, and blue anode electrodes R_AE, G_AE, and B_AE.

The light receiving opening OP2 of the pixel definition layer PDL exposes at least a portion of the sensing anode electrode O_AE. The photoelectric conversion layer O_RL is located on the sensing anode electrode O_AE exposed by the light receiving opening OP2. The photoelectric conversion layer O_RL may include an organic photo-sensing material. The sensing cathode electrode O_CE may be located on the photoelectric conversion layer O_RL. The sensing cathode electrode O_CE may be formed simultaneously through the same process as that of the red, green, and blue cathode electrodes R_CE, G_CE, and B_CE. According to some embodiments of the present disclosure, the sensing cathode electrode O_CE has an integral shape with the red, green, and blue cathode electrodes R_CE, G_CE, and B_CE to form a common cathode electrode C_CE (see FIG. 6).

An encapsulation layer TFE is located on the element layer DP_ED. The encapsulation layer TFE includes at least an inorganic layer or an organic layer. According to some embodiments of the present disclosure, the encapsulation layer TFE may include two inorganic layers, and an organic layer located therebetween. According to some embodiments of the present disclosure, the encapsulation layer TFE may include a plurality of inorganic layers and a plurality of organic layers that are alternately laminated.

The inorganic layer protects the red, green and blue light emitting elements ED_R, ED_G, and ED_B, and the light receiving element OPD from moisture/oxygen and the organic layer protects the red, green and blue light emitting elements ED_R, ED_G, and ED_B and the light receiving element OPD from foreign substances, such as dust particles. The inorganic layer may include a silicon nitride layer, a silicon oxy nitride layer, a silicon oxide layer, a titanium oxide layer, or an aluminum oxide layer, but is not particularly limited thereto. The organic layer may include an acrylic-based organic layer, and is not particularly limited.

The display device DD includes an input sensing layer ISL that is located on the display panel DP, and a color filter layer CFL that is located on the input sensing layer ISL.

The input sensing layer ISL may be located directly on the encapsulation layer TFE. The input sensing layer ISL includes a first conductive layer ICL1, an insulating layer IL, a second conductive layer ICL2, and a protective layer PL. The first conductive layer ICL1 may be located on the encapsulation layer TFE. FIGS. 10A and 10B illustrate a structure, in which the first conductive layer ICL1 is directly located on the encapsulation layer TFE, but the present disclosure is not limited thereto. The input sensing layer ISL may further include a base insulating layer that is located between the first conductive layer ICL1 and the encapsulation layer TFE. In this case, the encapsulation layer TFE may be covered by the base insulating layer, and the first conductive layer ICL1 may be located on the base insulating layer. According to some embodiments of the present disclosure, the base insulating layer may include an inorganic insulating material.

The insulating layer IL may cover the first conductive layer ICL1. The second conductive layer ICL2 is located on the insulating layer IL. Although it is illustrated that the input sensing layer ISL has a structure including first and second conductive layers ICL1 and ICL2, the present disclosure is not limited thereto. For example, the input sensing layer ISL may include only one of the first and second conductive layers ICL1 and ICL2.

A protective layer PL may be located on the second conductive layer ICL2. The protective layer PL may include an organic insulating material. The protective layer PL may serve to protect the first and second conductive layers ICL1 and ICL2 from moisture/oxygen and protect the first and second conductive layers ICL1 and ICL2 from foreign substances.

A color filter layer CFL may be located on the input sensing layer ISL. The color filter layer CFL may be located directly on the protective layer PL. The color filter layer CFL may include a first color filter CF_R, a second color filter CF_G, and a third color filter CF_B. The first color filter CF_R has a first color, the second color filter CF_G has a second color, and the third color filter CF_B has a third color. As an example from the present disclosure, the first color may be red, the second color may be green, and the third color may be blue.

The color filter layer CFL may further include a dummy color filter DCF. According to some embodiments of the present disclosure, when an area, in which the photoelectric conversion layer O_RL is located, is defined as a light receiving area SA, and a periphery of the light-receiving area SA is defined as a non-light receiving area NSA, a dummy color filter DCF may be arranged to correspond to the light receiving area SA. The dummy color filter DCF may overlap the light receiving area SA and the non-light receiving area NSA. According to some embodiments of the present disclosure, the dummy color filter DCF may have the same color as that of one of the first to third color filters CF_R, CF_G, and CF_B. According to some embodiments of the present disclosure, the dummy color filter DCF may have the same green color as that of the second color filter CF_G.

The color filter layer CFL may further include a black matrix BM. The black matrix BM may be arranged to correspond to the non-pixel area NPA. The black matrix BM may be arranged to overlap the first and second conductive layers ICL1 and ICL2 in the non-pixel area NPA. According to some embodiments of the present disclosure, the black matrix BM may overlap the non-pixel area NPA and the first to third non-light emission areas NPXA-G, NPXA-B, and NPXA-R. The black matrix BM may not overlap the first to third light emission areas PXA-R, PXR-G, and PXA-B.

The color filter layer CFL may further include an over-coating layer OCL. The over-coating layer OCL may include an organic insulating material. The over-coating layer OCL may be provided with a thickness that is sufficient to remove steps between the first to third color filters CF_R, CF_G, and CF_B. The over-coating layer OCL may have a specific thickness and may include a material that may flatten an upper surface of the color filter layer CFL without being particularly limited, and for example, it may include an acrylate-based organic material.

Referring to FIG. 10B, when the display device DD (see FIG. 1) is operated, each of the red, green, and blue light emitting elements ED_R, ED_G, and ED_B may output light. The red light emitting element ED_R outputs red light in a red wavelength range, the green light emitting elements ED_G outputs green light in a green wavelength range, and the blue light emitting elements ED_B outputs blue light in a blue wavelength range.

According to some embodiments of the present disclosure, the light receiving element OPD may receive light from among the red, green, and blue light emitting elements ED_R, ED_G, and ED_B, specific light emitting elements (for example, the green light emitting elements ED_G). That is, the light receiving element OPD may receive the second reflected light Lg2 that is obtained when the second light Lg1 output from the green light emitting elements ED_G is reflected by a fingerprint of the user. The second light Lg1 and the second reflected light Lg2 may be green light in the green wavelength range. A dummy color filter DCF is located on an upper side of the light receiving element OPD. The dummy color filter DCF may have a green color. Accordingly, the second reflected light Lg2 may pass through the dummy color filter DCF and be input to the light receiving element OPD.

Meanwhile, red and blue lights output from the red and blue light emitting elements ED_R and RED_B may also be reflected by a hand US_F of the user. For example, when the light that is obtained when the red light LR1 output from the red light emitting elements ED_R is reflected by the hand US_F of the user is defined as first reflected light Lr2, the first reflected light Lr2 may not pass through the dummy color filter DCF and may be absorbed. Accordingly, the first reflected light LR2 cannot pass through the dummy color filter DCF and thus cannot be input to the light receiving element OPD. Similarly, even though blue light is reflected by the hand US_F of the user, it may be absorbed by the dummy color filter DCF. Accordingly, only the second reflected light Lg2 may be provided to the light receiving element OPD.

Figure 11:
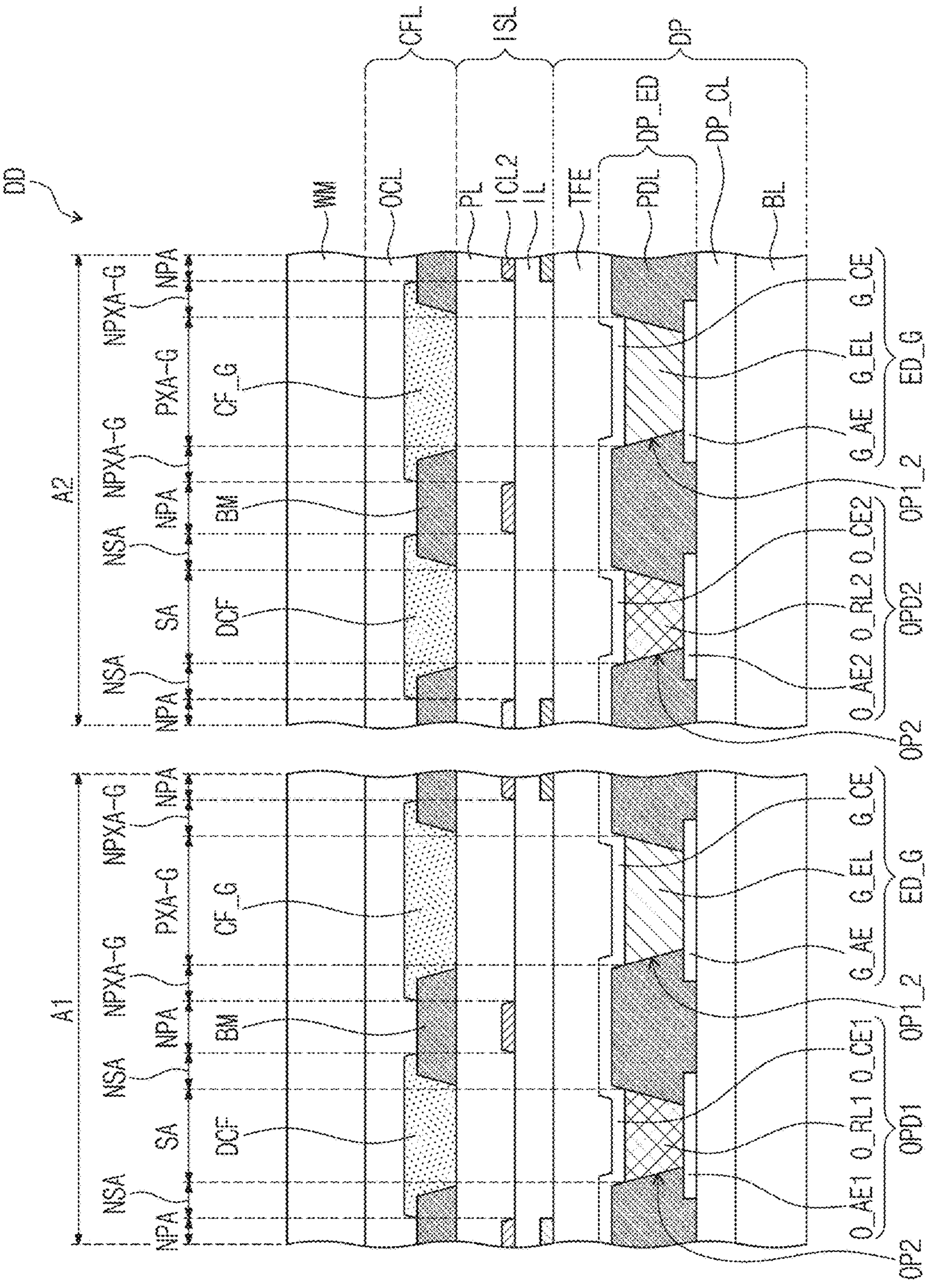
FIG. 11 is a cross-sectional view illustrating a light emitting element and a light receiving element of a display panel according to some embodiments of the present disclosure.

FIG. 11 is a cross-sectional view illustrating a light emitting element and a light receiving element of a display panel according to some embodiments of the present disclosure. FIG. 11 is a view illustrating a light emitting element ED_G and light receiving elements OPD1 and OPD2 in the first area A1 and the second area A2. Hereinafter, a repeated description of the contents described above will be omitted.

Referring to FIG. 11, the first light receiving element OPD1 may be located in the first area A1. The first light receiving element OPD1 may include a first sensing anode electrode O_AE1, a first photoelectric conversion layer O_RL1, and a first sensing cathode electrode O_CE1. The first light receiving element OPD1 may include the same configuration as that of the light receiving element OPD described in FIG. 10A. The light receiving opening OP2A of the pixel definition layer PDL exposes at least a portion of the first sensing anode electrode O_AE1. The first photoelectric conversion layer O_RL1 is located on the first sensing anode electrode O_AE1 exposed by the light receiving opening OP2A. The first photoelectric conversion layer O_RL1 may include an organic photo sensing material.

The second light receiving element OPD2 may be located in the second area A2. The second light receiving element OPD2 may include a second sensing anode electrode O_AE2, a second photoelectric conversion layer O_RL2, and a second sensing cathode electrode O_CE2. The second light receiving element OPD2 may include the same configuration as that of the first light receiving element OPD1. The light receiving opening OP2*b* of the pixel definition layer PDL exposes at least a portion of the second sensing anode electrode O_AE2. The second photoelectric conversion layer O_RL2 is located on the second sensing anode electrode O_AE2 exposed by the light receiving opening OP2*b*. The second photoelectric conversion layer O_RL2 may include an organic photo sensing material.

Referring to FIGS. 4A, 4B, and 11 together, the first area A1 may be defined as a sensing area, and the second area A2 may be defined as a non-sensing area. As illustrated in FIG. 4A, in the sensor driving circuit connected to the first light receiving element OPD1 located in the first area A1, the output transistor and the read-out line are connected to each other, whereby a sensing signal may be transmitted to the read-out line. Accordingly, biometric information may be recognized based on the sensing signal, and the first area A1 may be defined as a sensing area. However, as illustrated in FIG. 4B, in the second sensor driving circuit O_SDa connected to the second light receiving element OPD2 located in the second area A2, the output transistor ST3 is separated from the vertical connection line V_CL, and thus, cannot transmit the sensing signal FSd (see FIG. 4A) to the vertical connection line V_CL in response to the output control signal. Accordingly, the second area A2 may be defined as a non-sensing area.

Figure 12:
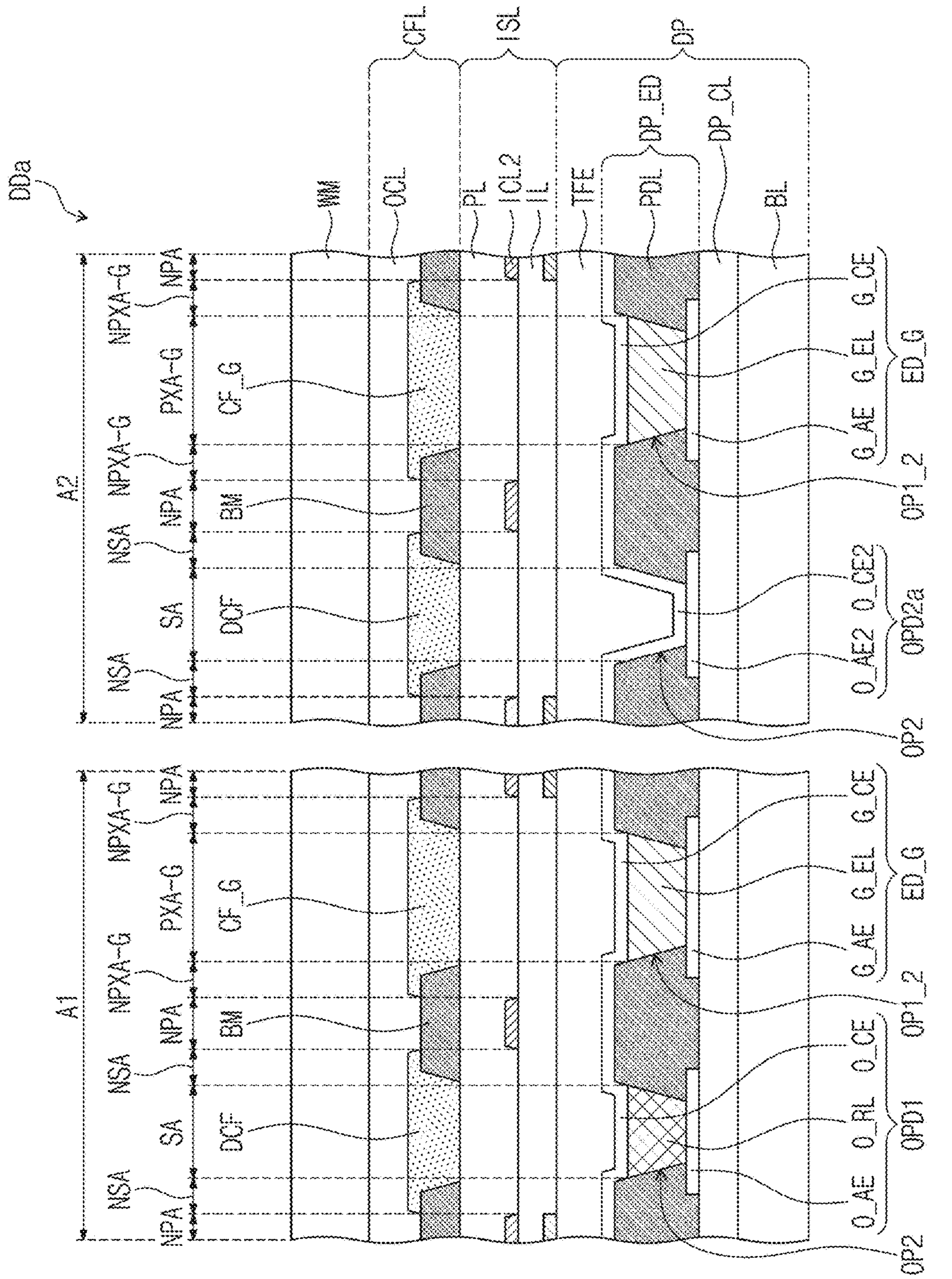
FIG. 12 is a cut-away cross-sectional view of a portion of a display device according to some embodiments of the present disclosure.

FIG. 12 is a cut-away cross-sectional view of a portion of a display device according to some embodiments of the present disclosure.

Referring to FIG. 12, the first light receiving element OPD1 may be located in the first area A1, and the second light receiving element OPD2*a* may be located in the second area A2. The second light receiving element OPD2*a* may include a second sensing anode electrode O_AE2 and a second sensing cathode electrode O_CE2. A photoelectric conversion layer O_RL may not be located in the second light receiving element OPD2*a*, compared to the first light receiving element OPD1. However, the present disclosure is not limited thereto, and the second light receiving element OPD2*a* may include only the second sensing cathode electrode O_CE2.

Because the second light receiving element OPD2*a* does not include a photoelectric conversion layer, the sensor driving circuit connected to the second light receiving element OPD2*a* may not transmit the sensing signal to the read-out line. Accordingly, the second area A2 may be defined as a non-sensing area.

Figure 13:
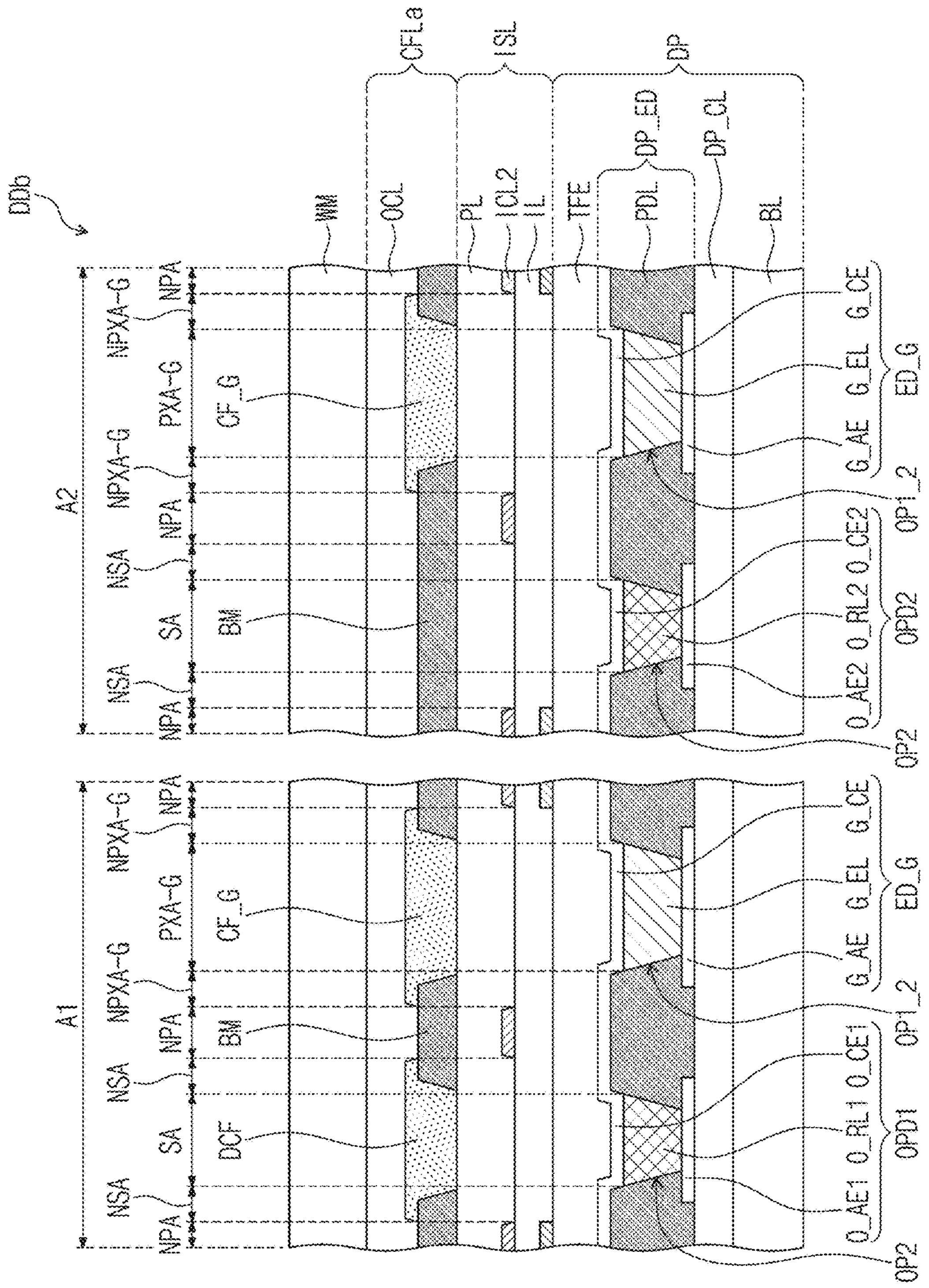
FIG. 13 is a cut-away cross-sectional view of a portion of a display device according to some embodiments of the present disclosure.

FIG. 13 is a cut-away cross-sectional view of a portion of a display device according to some embodiments of the present disclosure.

Referring to FIG. 13, the first light receiving element OPD1 may be located in the first area A1, and the second light receiving element OPD2 may be located in the second area A2. The first light receiving element OPD1 and the second light receiving element OPD2 may correspond to the first light receiving element OPD1 and the second light receiving element OPD2 illustrated in FIG. 11, respectively.

A color filter layer CFLA may be located on the input sensing layer ISL. The color filter layer CFL may include a dummy color filter DCF. According to some embodiments of the present disclosure, in the second area A2, a black matrix BM may be located in an area that overlaps the photoelectric conversion layer O_RL2. The black matrix BM may include a black organic dye/pigment and the like. Accordingly, the black matrix BM may have light absorption characteristics. In the second area A2, the black matrix BM may be located in an area that overlaps the photoelectric conversion layer O_RL2 so that light may not be provided to the photoelectric conversion layer O_RL2. Accordingly, the sensor driving circuit connected to the second light receiving element OPD2 may not transmit the sensing signal to the read-out line. Accordingly, a light receiving area SA cannot be formed in the second area A2 to correspond to the second light receiving element OPD2, and the second area A2 may be defined as a non-sensing area.

Figure 14A:
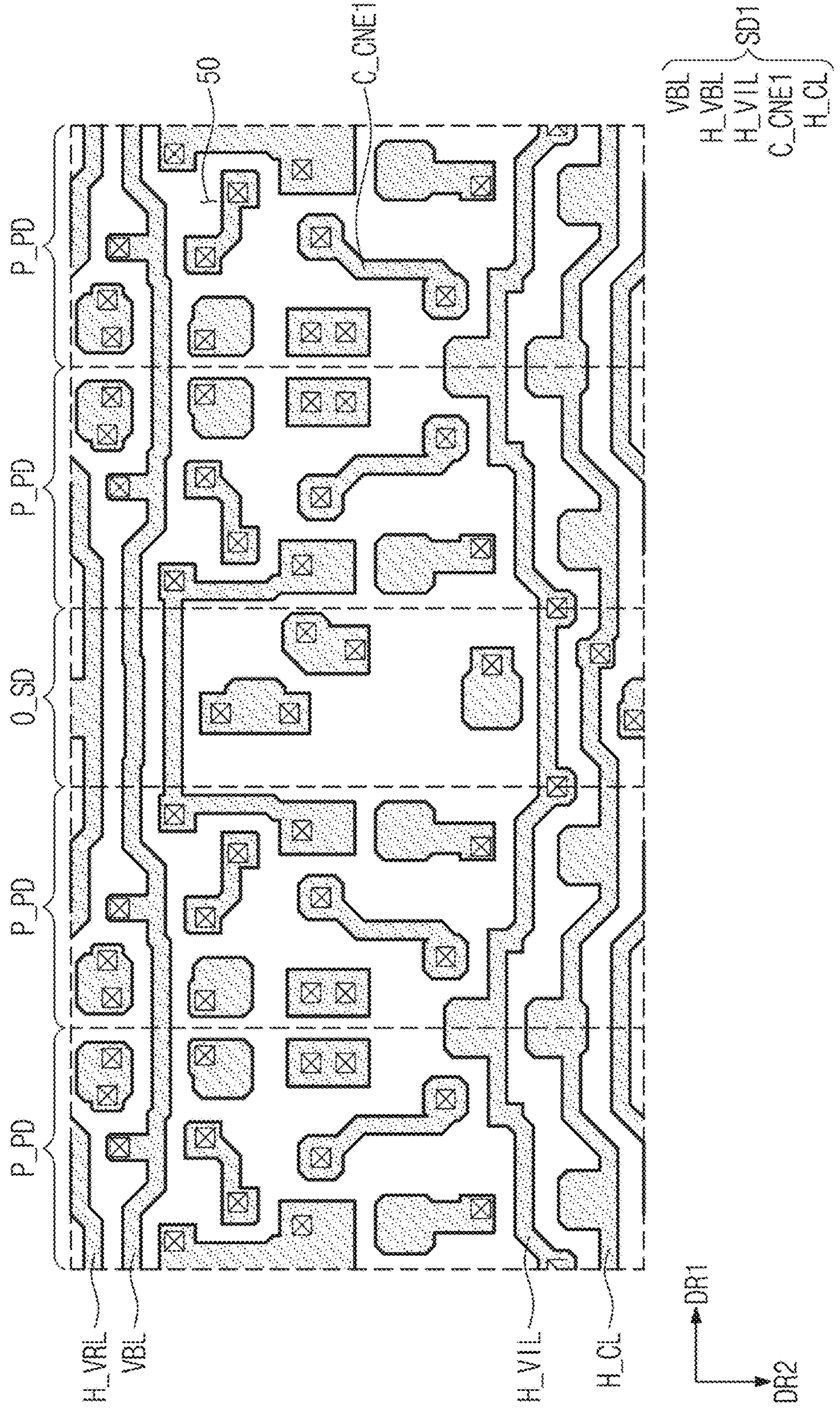
FIGS. 14A to 14C are plan views illustrating an arrangement order of a circuit layer according to some embodiments of the present disclosure.
Figure 14B:
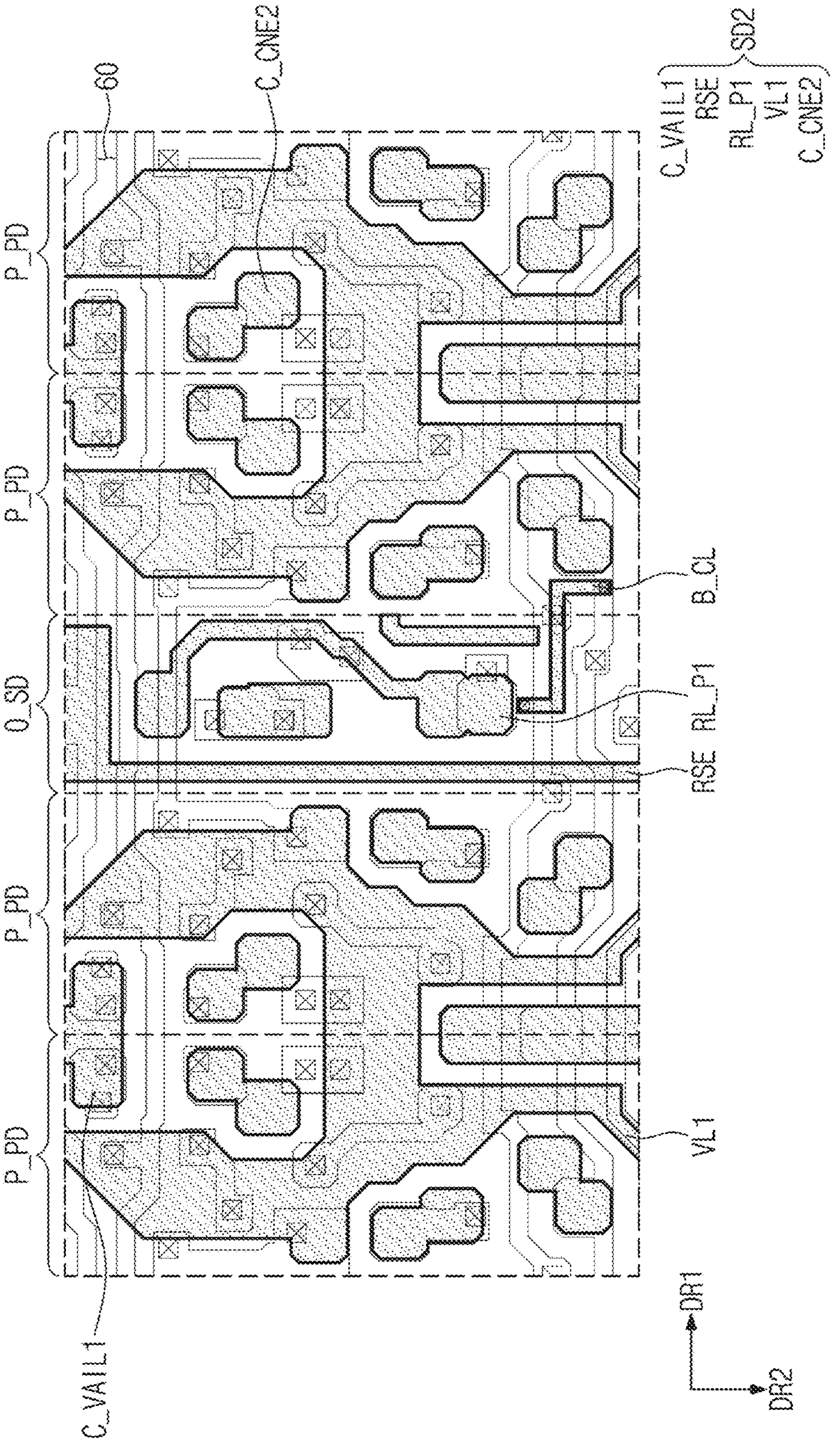
Figure 14C:
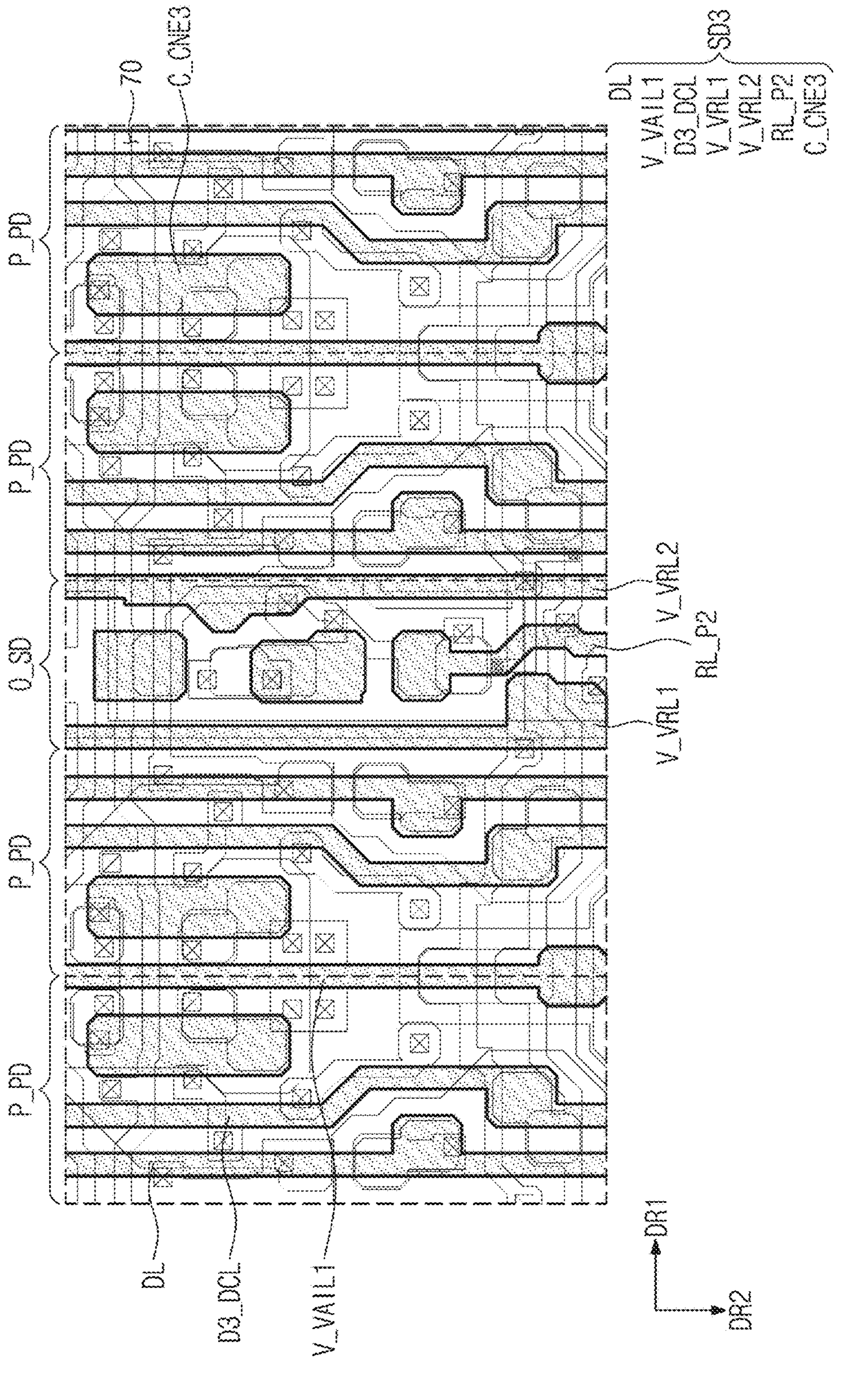

FIGS. 14A to 14C are plan views illustrating an arrangement order of a circuit layer according to some embodiments of the present disclosure.

Referring to FIGS. 14A to 14C, the conductive patterns and semiconductor patterns may have a structure, in which they are repeatedly arranged in a specific regularity on a plane. In FIGS. 14A to 14C, portions of pixel driving circuits P_PD and portions of sensor driving circuits O_SD are illustrated.

Referring to FIG. 14A, the fifth insulating layer 50 may be located on the fourth insulating layer 40 (see FIG. 6). A first data pattern layer SD1 may be located on the fifth insulating layer 50. The first data pattern layer SD1, for example, may include a metal, an alloy, a conductive metal oxide, or a transparent conductive material. Hereinafter, for convenience of description, only some of the components included in the first data pattern layer SD1 are illustrated in FIG. 14A.

The first data pattern layer SD1 may include a horizontal reset voltage line H_VRL, a bias voltage line VBL, a first horizontal initialization voltage line H_VIL, and a plurality of first connection electrode patterns C_CNE1.

The horizontal reset voltage line H_VRL, the bias voltage line VBL, and the first horizontal initialization voltage line H_VIL may extend in the first direction DR1. The horizontal reset voltage line H_VRL, the bias voltage line VBL, and the first horizontal initialization voltage line H_VIL may be spaced apart from each other in the second direction DR2.

The horizontal reset voltage line H_VRL may be a configuration that is included in the reset voltage line VRL of FIG. 4A. The reset voltage VRst (see FIG. 4A) may be provided as a horizontal reset voltage line H_VRL. The horizontal reset voltage line H_VRL may be electrically connected to the reset transistor ST1. The reset transistor ST1 may receive the reset voltage VRst through the horizontal reset voltage line H_VRL. The bias voltage line VBL may correspond to the bias voltage line VBL of FIG. 4A. The bias voltage Vbias (see FIG. 4A) may be provided as a bias voltage line VBL. The bias voltage line VBL may be connected to the eighth transistor T8 (see FIG. 4A) through a contact part. The eighth transistor T8 may receive the bias voltage Vbias through the bias voltage line VBL.

The first horizontal initialization voltage line H_VIL may be included in the first initialization voltage line VIL of FIG. 4A. The first initialization voltage Vint (see FIG. 4A) may be provided as the first horizontal initialization voltage line H_VIL. The first horizontal initialization voltage line H_VIL may be connected to the fourth transistor T4 (see FIG. 4A) through a contact part. The fourth transistor T4 may receive the first initialization voltage Vint through the first horizontal initialization voltage line H_VIL.

The plurality of first connection electrode patterns C_CNE1 may contact one of the semiconductor patterns included in the pixel driving circuit P_PD and the sensor driving circuit O_SD. The plurality of first connection electrode patterns C_CNE1 may perform the function of electrically connecting one of the semiconductor patterns to other wiring lines or lines. The plurality of first connection electrode patterns C_CNE1 may be connected to one of the semiconductor patterns through a contact part. The plurality of first connection electrode patterns C_CNE1 may include the first and third connection electrodes CNE10 and CNE11 illustrated in FIG. 6.

The first data pattern layer SD1 may further include horizontal connection lines H_CL. The horizontal connection lines H_CL may extend in the first direction DR1.

Referring to FIG. 14B, the sixth insulating layer 60 may cover at least a portion of the first data pattern layer SD1, and may be located on the fifth insulating layer 50 (see FIG. 14A). The second data pattern layer SD2 may be located on the sixth insulating layer 60. The second data pattern layer SD2, for example, may include a metal, an alloy, a conductive metal oxide, or a transparent conductive material.

The second data pattern layer SD2 includes a first driving voltage line VL1, a shielding electrode wiring line RSE, a first line part RL_P1 of the read-out wiring line RL (see FIG. 6), and a plurality of connection patterns.

The first driving voltage line VL1 may overlap the pixel driving circuit P_PD. The first driving voltage line VL1 may correspond to the first driving voltage line VL1 of FIG. 4A. The first driving voltage ELVDD (see FIG. 4A) may be provided to the first driving voltage line VL1. The first driving voltage line VL1 may be arranged in a mesh shape in the display area DA (see FIG. 3) of the display panel DP. The first driving voltage line VL1 may be connected to the fifth transistor T5 and the capacitor Cst illustrated in FIG. 4A through a contact part.

The shielding electrode wiring line RSE may be electrically connected to the horizontal reset voltage line H_VRL illustrated in FIG. 14A, and may receive the reset voltage VRst (see FIG. 4A) through the horizontal reset voltage line H_VRL. On a plane, the shielding electrode wiring line RSE may be located between the read-out wiring line RL and the data line DL (see FIG. 14C). Accordingly, the shielding electrode wiring line RSE may perform a function of shielding the sensing signal output from the read-out wiring line RL from being coupled by the data signal.

The first line part RL_P1 and the vertical reset voltage line V_VRL extend in the second direction DR2, and are arranged to be spaced apart from each other in the first direction DR1. The read-out wiring line RL may correspond to the read-out lines RL1 to RLh illustrated in FIG. 3. The read-out wiring line RL may be connected to the sensor driving circuit O_SD (particularly, the output transistor ST3) illustrated in FIG. 4A.

The plurality of connection patterns may include a second initialization connection pattern C_VAIL. The second initialization connection pattern C_VAIL may be arranged to be spaced apart from each other in the first direction DR1. The second initialization connection pattern C_VAIL may be connected to the first horizontal initialization voltage line H_VIL illustrated in FIG. 14A.

The second data pattern layer SD2 may further include a plurality of second connection electrode patterns C_CNE2. The plurality of second connection electrode patterns C_CNE2 may include the second and fourth connection electrodes CNE20 and CNE21 illustrated in FIG. 6.

The second data pattern layer SD2 may further include a bridge line B_CL. The bridge line B_CL may be one of the first bridge line B_CL1 or the second bridge line B_CL2 illustrated in FIG. 7. The bridge line B_CL may connect the horizontal connection lines H_CL illustrated in FIG. 14A and the second line part RL_P2 illustrated in FIG. 14C.

Referring to FIG. 14C, the seventh insulating layer 70 may cover at least a portion of the second data pattern layer SD2, and may be located on the sixth insulating layer 60 (see FIG. 14B). A third data pattern layer SD5 may be located on the seventh insulating layer 70. The third data pattern layer SD5, for example, may include a metal, an alloy, a conductive metal oxide, a transparent conductive material, and the like.

The third data pattern layer SD5 may include a data line DL, a vertical data connection line D3_DCL, a (2-1)-th vertical initialization voltage line V_VAIL1, vertical reset voltage lines V_VRL1 and V_VRL2, and a second line part RL_P2, and a plurality of third connection electrode patterns C_CNE3.

The data line DL, the vertical data connection line D3_DCL, the (2-1)-th vertical initialization voltage line V_VAIL1 may extend in the second direction DR2. The data line DL, the vertical data connection line D3_DCL, the (2-1)-th vertical initialization voltage line V_VAIL1 may be spaced apart from each other in the first direction DR1.

The data line DL may correspond to the data lines DL1 to DLm illustrated in FIG. 3. The data line DL may be connected to the pixel driving circuit P_PD (particularly, the second transistor T2) illustrated in FIG. 4A.

The (2-1)-th vertical initialization voltage line V_VAIL1 is electrically connected to the horizontal initialization voltage line. The third data pattern layer SD5 may further include a vertical initialization voltage line. For example, the third data pattern layer SD5 may further include a first vertical initialization voltage line that is electrically connected to the first horizontal initialization voltage line H_VIL illustrated in FIG. 14A.

The vertical reset voltage lines V_VRL1 and V_VRL2 may be included in the reset voltage line VRL of FIG. 4A. The vertical reset voltage lines V_VRL1 and V_VRL2 may be electrically connected to the horizontal reset voltage line H_VRL illustrated in FIG. 14A. By coupling the vertical reset voltage lines V_VRL1 and V_VRL2 and the horizontal reset voltage line H_VRL, the reset voltage line VRL may have a mesh shape.

The second line part RL_P2 may be located between the vertical reset voltage lines V_VRL1 and V_VRL2. The second line part RL_P2 and the vertical reset voltage lines V_VRL1 and V_VRL2 extend in the second direction DR2, and are arranged to be spaced apart from each other in the first direction DR1.

The plurality of third connection electrode patterns C_CNE3 may include the fifth connection electrode CNE30 and the sixth connection electrode CNE31 illustrated in FIG. 6.

The display device of the present disclosure may include the connection line parts located in the second area corresponding to the non-sensing area of the display area. Accordingly, a sensing signal may be transmitted to the sensor chip by connecting the read-out line located in the first area corresponding to the sensing area of the display area and the sensor chip, through the connection line parts. Because a portion of the connection line parts is located in the display area, the extent of the area occupied by the connection line parts in the non-display area may be decreased, and as a result, the extent of the dead space of the display panel may be decreased.

In addition, because the sensing area may be freely set depending on the location and the configuration of the connection line parts, the sensing degree of freedom may be relatively improved and the reliable display device may be provided.

Although aspects of some embodiments of the present disclosure have been described with reference to some embodiments, it will be appreciated by an ordinary skilled in the art, to which the present disclosure pertains, that the present disclosure may be modified and changed within the scope of the appended claims, and their equivalents, without departing from the spirit and scope of embodiments according to the present disclosure.

Therefore, the technical scope of the present disclosure should not be limited to the detailed description of the specification, but should be determined by the appended claims, and their equivalents.

What is claimed is:

1. A display device comprising:

a base layer, in which a display area and a non-display area are defined;

a circuit layer on the base layer; and an element layer on the circuit layer, and including light emitting elements and light receiving elements to correspond to the display area, wherein the circuit layer includes:

pixel driving circuits connected to the light emitting elements;

sensor driving circuits connected to the light receiving elements;

data lines connected to the pixel driving circuits;

read-out lines in a first area of the display area, and connected to, among the sensor driving circuits, a first sensor driving circuit in the first area; and a connection line part connecting the read-out lines to a read-out circuit, and wherein the connection line part includes:

first connection lines in a second area of the display area; and second connection lines connecting the first connection lines to the read-out lines.

2. The display device of claim 1, wherein the read-out lines and the first connection lines extend in a first direction, and are arranged in a second direction crossing the first direction, and wherein the second connection lines extend in the second direction.

3. The display device of claim 2, wherein the read-out lines and the first connection lines are on a same layer.

4. The display device of claim 3, wherein the data lines are on a same layer as that of the read-out lines and the first connection lines.

5. The display device of claim 3, wherein the second connection lines are on a different layer from that of the read-out lines and the first connection lines.

6. The display device of claim 5, wherein the circuit layer further includes:

a bridge line electrically connecting the second connection lines to the read-out lines and the first connection lines.

7. The display device of claim 6, wherein the bridge line further includes:

a first bridge line electrically connecting the read-out lines and the second connection lines; and a second bridge line electrically connecting the first connection lines and the second connection lines.

8. The display device of claim 6, wherein the bridge line is on a different layer from that of the read-out lines and the first connection lines.

9. The display device of claim 1, wherein the light receiving elements include:

a first light receiving element in the first area; and a second light receiving element in the second area.

10. The display device of claim 9, wherein the first light receiving element includes:

a first electrode;

a photoelectric conversion layer on the first electrode; and a second electrode on the photoelectric conversion layer, wherein the second light receiving element includes:

a third electrode; and a fourth electrode on the third electrode, and wherein the photoelectric conversion layer is not between the third electrode and the fourth electrode.

11. The display device of claim 10, wherein the sensor driving circuits include:

a first sensor driving circuit in the first area and connected to the first light receiving element; and a second sensor driving circuit in the second area and connected to the second light receiving element.

12. The display device of claim 11, wherein the first sensor driving circuit includes:

a first output transistor electrically connected to a corresponding one of the read-out lines, and wherein the second sensor driving circuit includes:

a second output transistor electrically connected to a corresponding one of the first connection lines.

13. The display device of claim 9, wherein the first light receiving element includes:

a first electrode;

a first photoelectric conversion layer on the first electrode; and a second electrode on the first photoelectric conversion layer, and wherein the second light receiving element includes:

a third electrode;

a second photoelectric conversion layer on the third electrode; and a fourth electrode on the second photoelectric conversion layer.

14. The display device of claim 13, wherein the sensor driving circuits include:

a first sensor driving circuit in the first area and connected to the first light receiving element; and a second sensor driving circuit in the second area and connected to the second light receiving element.

15. The display device of claim 14, wherein the first sensor driving circuit includes:

a first output transistor electrically connected to a corresponding one of the read-out lines, and wherein the second sensor driving circuit includes:

a second output transistor electrically separated from a corresponding one of the first connection lines.

16. The display device of claim 1, further comprising:

a color filter layer including a light shielding pattern layer, in which a plurality of openings are defined, and a plurality of color filters overlapping the openings, on the element layer, wherein the color filter layer further includes a dummy color filter corresponding to a light receiving element from among the light receiving elements, and the dummy color filter is not in the second area.

17. The display device of claim 1, wherein the second area includes a (2-1)-th area and a (2-2)-th area being spaced apart from each other with the first area being interposed therebetween.

18. The display device of claim 17, wherein a plurality of first areas are provided, and wherein the second area further includes (2-3)-th areas between the first areas.

19. A display device comprising:

a base layer, in which a display area and a non-display area are defined;

a circuit layer on the base layer; and an element layer on the circuit layer, and including light emitting elements corresponding to the display area, first light receiving elements in a first area of the display area, and second light receiving elements in a second area of the display area, wherein the circuit layer includes:

pixel driving circuits connected to the light emitting elements;

first sensor driving circuits connected to the first light receiving elements;

second sensor driving circuits connected to the second light receiving elements;

data lines connected to the pixel driving circuits;

read-out lines in the first area of the display area, and connected to the first sensor driving circuits; and a connection line part connecting the read-out lines to a read-out circuit, and wherein the connection line part includes:

first connection lines in a second area of the display area; and second connection lines connecting the first connection lines to the read-out lines.

20. An electronic device comprising:

a display device comprising:

a base layer, in which a display area and a non-display area are defined;

a circuit layer on the base layer; and an element layer on the circuit layer, and including light emitting elements and light receiving elements to correspond to the display area, wherein the circuit layer includes:

pixel driving circuits connected to the light emitting elements;

sensor driving circuits connected to the light receiving elements;

data lines connected to the pixel driving circuits;

read-out lines in a first area of the display area, and connected to, among the sensor driving circuits, a first sensor driving circuit in the first area; and a connection line part connecting the read-out lines to a read-out circuit, and wherein the connection line part includes:

first connection lines in a second area of the display area; and second connection lines connecting the first connection lines to the read-out lines.

* * * * *